United States Patent
Brown et al.

(10) Patent No.: US 10,981,625 B2
(45) Date of Patent: Apr. 20, 2021

(54) BICYCLE REAR DERAILLEUR

(71) Applicant: SRAM, LLC, Chicago, IL (US)

(72) Inventors: Joshua Brown, Chicago, IL (US); Paul Feuerstein, Brookfield, IL (US); David Reyes, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 16/146,203

(22) Filed: Sep. 28, 2018

(65) Prior Publication Data

US 2019/0100280 A1 Apr. 4, 2019

Related U.S. Application Data

(63) Continuation-in-part of application No. 15/722,712, filed on Oct. 2, 2017.

(51) Int. Cl.
| | | |
|---|---|---|
| *B62M 9/122* | (2010.01) | |
| *B62M 9/125* | (2010.01) | |
| *B62M 1/36* | (2013.01) | |

(52) U.S. Cl.
CPC .............. *B62M 9/122* (2013.01); *B62M 1/36* (2013.01); *B62M 9/125* (2013.01)

(58) Field of Classification Search
CPC ...... B62M 9/121; B62M 9/122; B62M 9/125; B62M 9/126; B62M 1/38; B62N 9/124
See application file for complete search history.

(56) References Cited

U.S. PATENT DOCUMENTS

| | | | | |
|---|---|---|---|---|
| 5,494,307 A | * | 2/1996 | Anderson | B62M 9/122 280/236 |
| 6,623,389 B1 | | 9/2003 | Campagnolo | |
| 7,679,494 B2 | * | 3/2010 | Fujii | B62J 99/00 340/432 |
| 8,137,223 B2 | | 3/2012 | Watarai et al. | |
| 8,241,158 B2 | * | 8/2012 | Ishikawa | B62M 25/08 474/80 |
| 9,381,974 B2 | | 7/2016 | Katsura et al. | |
| 9,394,030 B2 | | 7/2016 | Shipman et al. | |
| 9,616,964 B2 | | 4/2017 | Kasai | |
| 9,676,444 B2 | | 6/2017 | Shipman et al. | |
| 9,890,838 B2 | * | 2/2018 | Shipman | F16H 9/06 |
| 9,963,197 B2 | | 5/2018 | Watarai et al. | |
| 10,220,913 B2 | * | 3/2019 | Kitamura | B62J 6/06 |
| 2005/0067808 A1 | * | 3/2005 | Uno | B62M 9/122 280/260 |

(Continued)

FOREIGN PATENT DOCUMENTS

| | | |
|---|---|---|
| CN | 103693155 | 4/2014 |
| CN | 104554605 | 4/2015 |

(Continued)

*Primary Examiner* — Michael R Mansen
*Assistant Examiner* — Robert T Reese

(57) ABSTRACT

A bicycle rear derailleur or gear changer may include a mounting portion mountable to a bicycle frame, an electrical portion attached to the mounting portion and including power supply alignment and attachment features, and an electrical cable electrically connected to the electrical portion and electrically connectable to a printed circuit board (PCB) of a movable member movably coupleable to the mounting portion. The mounting portion and the electrical portion may be formed of different materials.

20 Claims, 28 Drawing Sheets

(56) References Cited

U.S. PATENT DOCUMENTS

| | | | |
|---|---|---|---|
| 2007/0184925 A1 | 8/2007 | Ichida et al. | |
| 2014/0128190 A1 | 5/2014 | Emura et al. | |
| 2015/0111675 A1* | 4/2015 | Shipman | B62M 25/08 |
| | | | 474/82 |
| 2016/0107723 A1 | 4/2016 | Tsai | |
| 2016/0176478 A1* | 6/2016 | Chang | B62M 9/121 |
| | | | 474/69 |
| 2016/0221640 A1 | 8/2016 | Watarai | |
| 2016/0304161 A1 | 10/2016 | Shirai | |
| 2017/0101160 A1 | 4/2017 | Nishino | |
| 2017/0113759 A1 | 4/2017 | Watarai et al. | |
| 2018/0274623 A1* | 9/2018 | Brown | B62M 9/128 |

FOREIGN PATENT DOCUMENTS

| | | |
|---|---|---|
| EP | 1757517 A1 | 2/2007 |
| EP | 1752373 B1 | 11/2008 |
| EP | 2722266 | 10/2016 |
| EP | 2535254 | 7/2017 |
| JP | H02169383 | 6/1990 |
| JP | H0648368 A | 2/1994 |
| TW | 201412602 | 4/2014 |
| TW | 201632405 | 9/2016 |
| TW | 201637935 | 11/2016 |

* cited by examiner

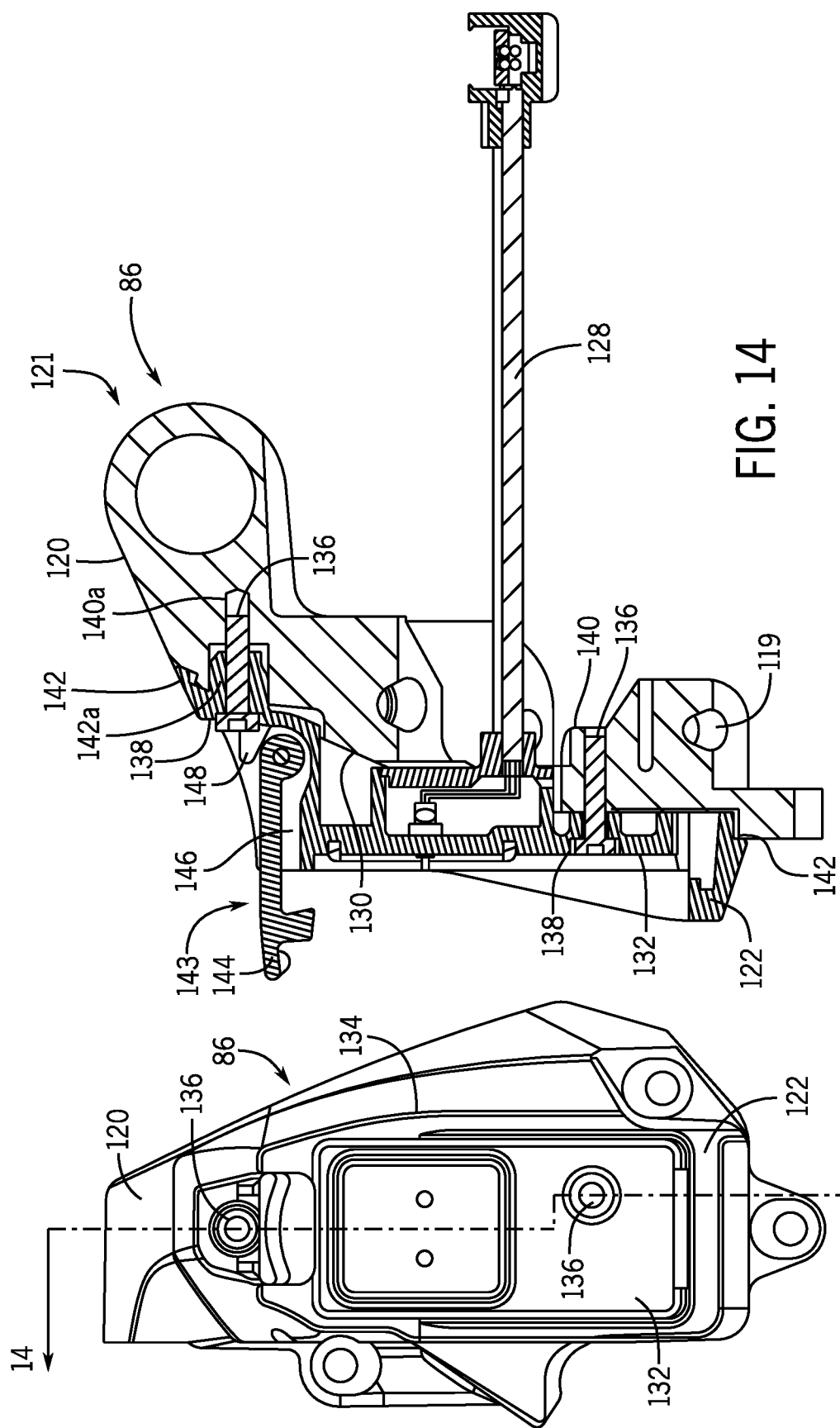

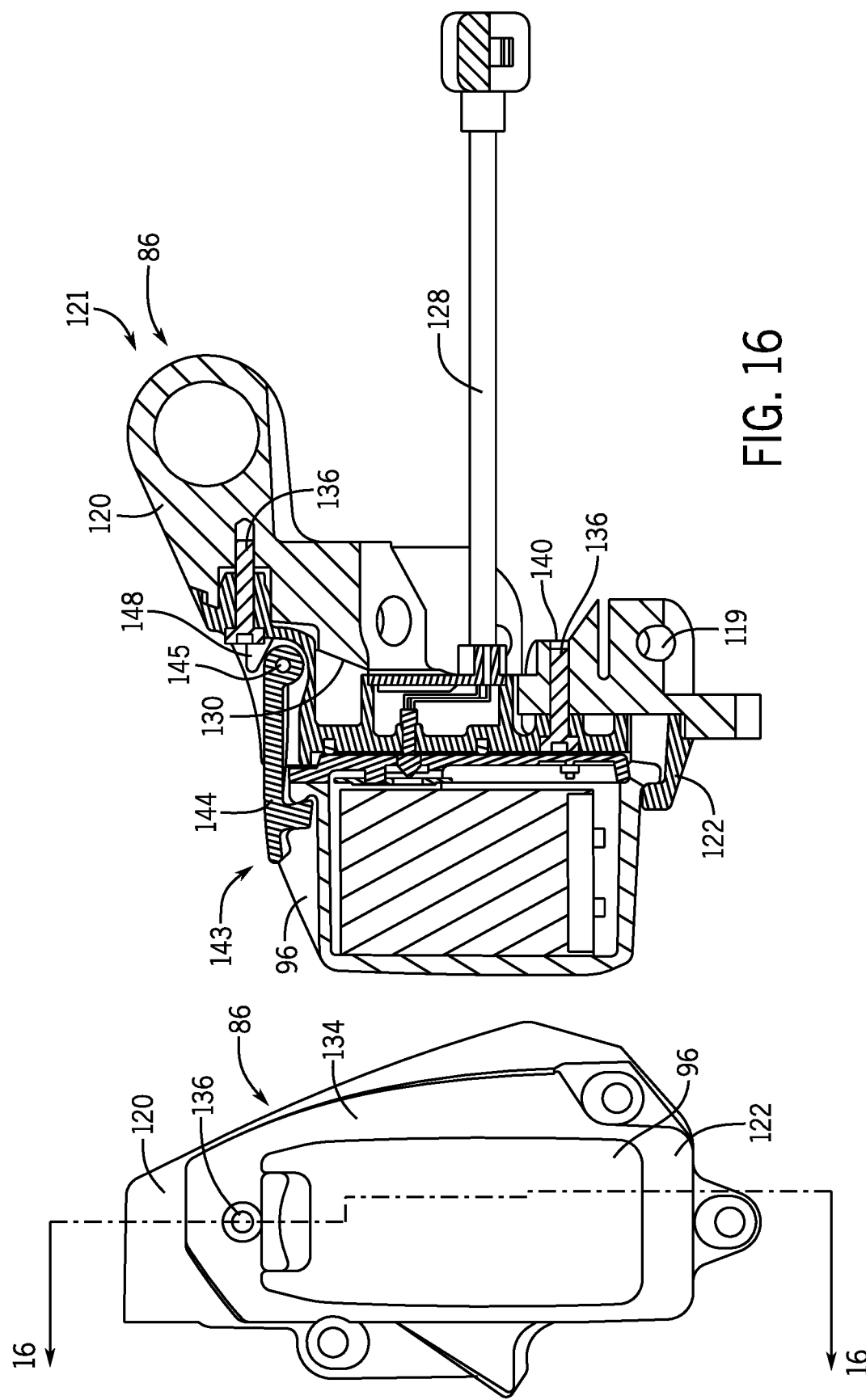

BICYCLE REAR DERAILLEUR

The present application is a continuation-in-part of U.S. patent application Ser. No. 15/722,712, filed Oct. 2, 2017, the content of which is herein incorporated in its entirety.

FIELD OF THE DISCLOSURE

The present disclosure is generally directed to a bicycle derailleur, and more particularly, to an electromechanical rear derailleur for a bicycle.

DESCRIPTION OF RELATED ART

Bicycle rear derailleurs are well known in the art as a part of a drivetrain of a bicycle. The typical drivetrain also includes a crank assembly that is coupled to one or more sprockets. The crank assembly is operable to drive a chain that is routed or wrapped around one of the sprockets. The chain is also routed to the rear wheel of the bicycle.

Rear derailleurs are provided as a part of the drivetrain to perform two basic functions. The primary function of the rear derailleur is to selectively shift a bicycle chain of the drivetrain among a series of different diameter cogs that are attached to the rear wheel. Shifting of the bicycle chain from one cog to another at the rear wheel is done in order to change the gear ratio of the drivetrain. The secondary function of the rear derailleur is to apply a tension to the chain to take-up slack, as well as to maintain the desired tension, in the chain on the non-drive-side of the drivetrain.

The rear derailleur may be a wireless, electrically actuated rear derailleur. A motor module and a battery electrically connected to the motor module may be carried on the electric rear derailleur. The battery supplies power to the motor module to switch a chain among rear sprockets of the bicycle.

A base member, or b-knuckle, of the rear derailleur may include power supply retention features, such that the b-knuckle interfaces with and retains a battery once the battery is installed on the rear derailleur. The b-knuckle, which may be made of a metal such as aluminum, is, for example, forged, and the battery retention features are machined The forging and machining of the b-knuckle is complex, time consuming, and expensive.

SUMMARY

In one example, a bicycle rear derailleur or gear changer is provided. The bicycle rear derailleur or gear changer may include a mounting portion mountable to a bicycle frame, an electrical portion attached to the mounting portion and including power supply alignment and attachment features, and an electrical cable electrically connected to the electrical portion and electrically connectable to a printed circuit board (PCB) of a movable member movably coupleable to the mounting portion. The mounting portion and the electrical portion may be formed of different materials.

In another example, a drivetrain for a bicycle is provided. The drivetrain includes a crank assembly including a front sprocket assembly, a rear sprocket assembly including a plurality of sprockets, a chain operably connecting the front sprocket assembly and the rear sprocket assembly; and a rear gear changer configured to move the chain between individual sprockets of the plurality of sprockets of the rear sprocket assembly. The rear gear changer includes a mounting portion mountable to a bicycle frame, an electrical portion attached to the mounting portion and including power supply alignment and attachment features, and an electrical cable electrically connected to the electrical portion and electrically connectable to a printed circuit board (PCB) of a movable member movably coupleable to the mounting portion. The mounting portion and the electrical portion are formed of different materials.

BRIEF DESCRIPTION OF THE DRAWINGS

Objects, features, and advantages of the present invention will become apparent upon reading the following description in conjunction with the drawing figures, in which:

FIG. 13 is a side view of a base member in accordance with the teachings of the present disclosure, without a power supply installed;

FIG. 14 is a cross-section view taken along line 14 of the base member of FIG. 13;

FIG. 15 is a side view of a base member in accordance with the teachings of the present disclosure, with a power supply installed;

FIG. 16 is a cross-section view taken along line 16 of the base member of FIG. 15;

DETAILED DESCRIPTION OF THE DISCLOSURE

Figure 1:
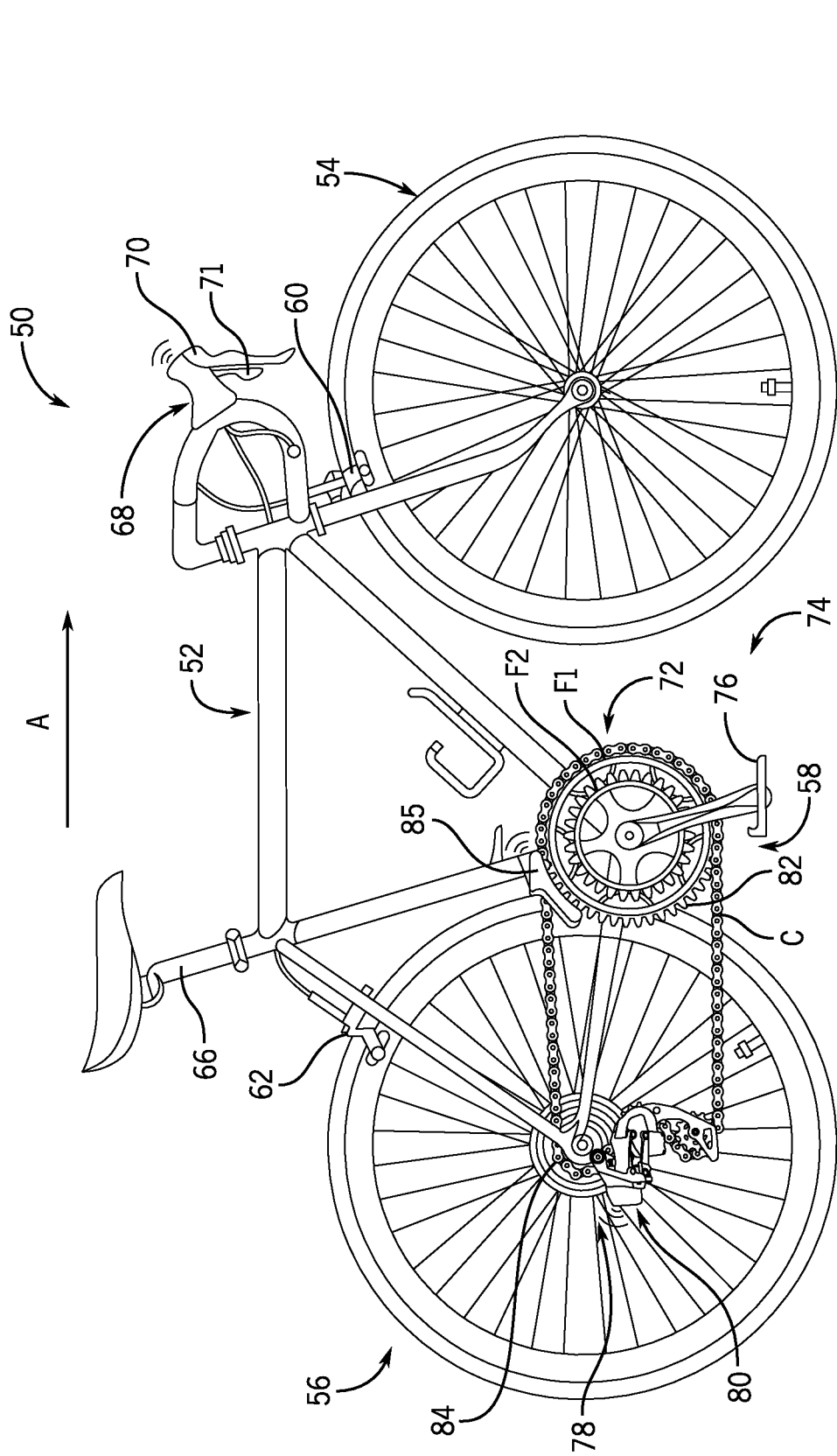
FIG. 1 is a side view schematic of a bicycle that may be constructed to utilize a damper on the rear derailleur.

The present disclosure provides examples of base members, or b-knuckles, and bicycle rear derailleurs that solve or improve upon one or more of the above-noted and/or other disadvantages with prior known b-knuckles and bicycle rear derailleurs. The disclosed b-knuckles eliminate the battery retention features from, for example, the forged metal portion of the b-knuckle and include the battery retention features on another portion (e.g., an injection molded plastic portion) of the b-knuckle. The injection molded plastic portion, for example, is removably or permanently coupled to the forged metal portion with fasteners. A significant advantage of the disclosed b-knuckles is that forging and machining of a metal formed part of the b-knuckle is greatly simplified, and the cost of manufacturing the b-knuckle is reduced compared to the prior art method of manufacturing. Another advantage of the disclosed b-knuckles is that the metal portion of the b-knuckle, for example, is completely removed from the battery interface and/or retention, thus shortening the tolerance loop and/or stack by at least one part.

In one example, a bicycle rear derailleur includes a base member having a first portion and a second portion. The first portion of the base member is mountable to a bicycle frame, and the second portion of the base member is attached to the first portion of the base member and including at least a portion of a power supply attachment. The bicycle rear derailleur also includes a movable member movably coupled to the first portion of the base member and electrically connected to the second portion of the base member. The bicycle rear derailleur also includes a chain guide assembly rotatably connected to the movable member. The chain guide assembly is configured to maintain a tension in the chain.

In one example, the second portion of the base member has a first side and a second side. The second side is at a distance from the first side. The first side abuts the first portion of the base member, and the second side includes alignment features within which a power supply is positionable.

In one example, the alignment features includes a recess at least partially defined by at least one protrusion extending away from a surface at the second side of the second portion of the base member.

In one example, the base member includes at least one electrical contact that extends from a surface of the second portion of the base member. The at least one electrical contact is electrically connectable with the power supply when the power supply is positioned within the alignment features of the second portion of the base member.

In one example, the at least one electrical contact includes two pins that extend from the surface of the second portion of the base member.

In one example, the bicycle rear derailleur further includes an electrical cable. The movable member includes a printed circuit board (PCB). The electrical cable electrically connects the PCB and the at least one electrical contact.

In one example, the power supply attachment portion includes a battery retaining member rotatably attached to a body of the second portion of the base member. The battery retaining member is rotatable between a first rotational position relative to the body of the second portion of the base member and a second rotational position relative to the body of the second portion of the base member.

In one example, the battery retaining member is a latch.

In one example, a portion of the latch is insertable into a securing catch of the power supply.

In one example, the first portion of the base member is made of a first material, and the second portion of the base member is made of a second material. The second material is different than the first material.

In one example, the first material is a metal, and the second material is a plastic.

In one example, a bicycle rear derailleur includes a base member having a first portion and a second portion. The first portion of the base member is mountable to a bicycle frame, and the second portion of the base member is removably coupled to the first portion of the base member. The second portion of the base member includes at least a portion of a power supply attachment. The bicycle rear derailleur further includes a movable member movable coupled to the first portion of the base member. The movable member is electrically connected to the second portion of the base member.

In one example, the second portion of the base member is removably coupled to the first portion of the base member with fasteners.

In one example, the power supply attachment includes a battery retaining member rotatably attached to a body of the second portion of the base member.

In one example, the battery retaining member is a latch.

In one example, the battery retaining member is rotatable between a first rotational position relative to the body and a second rotational position relative to the body. The second portion of the base member further includes at least one stop extending away from a surface of the body. The battery retaining member abuts the at least one stop when the battery retaining member is in the second rotational position relative to the body, such that rotation of the battery retaining member past the second rotational position relative to the body is prevented.

In one example, the second portion of the base member has a first side and a second side. The second side is at a distance from the first side. The first side abuts the first portion of the base member, and the second side includes alignment features within which a power supply is positionable.

In one example, the base member includes at least one electrical contact that extends from a surface at the second side of the second portion of the base member. The at least one electrical contact is electrically connectable with the power supply when the power supply is positioned within the alignment features of the second portion of the base member.

In one example, the bicycle rear derailleur further includes an electrical cable. The movable member includes a PCB, and the electrical cable electrically connects the PCB and the at least one electrical contact.

In one example, the first portion of the base member is made of a first material, and the second portion of the base member is made of a second material. The second material is different than the first material.

Turning now to the drawings, FIG. 1 generally illustrates a bicycle 50 that employs a rear derailleur constructed in accordance with the teachings of the present disclosure. The bicycle 50 includes a frame 52, a front wheel 54 and a rear wheel 56 each rotatably attached to the frame 52, and a drivetrain 58. A front brake 60 is provided for braking the front wheel 54, and a rear brake 62 is provided for braking the rear wheel 56. The bicycle 50 also generally has a seat 64 near a rear end of the frame 52 and carried on an end of a seat tube 66 connected to the frame 52. The bicycle 50 also has handlebars 68 near a forward end of the frame 52. A brake lever 70 is carried on the handlebars 68 for actuating one of the front brake 60 or rear brake 62, or both. If the brake lever 70 actuates only one of the front brake 60 and the rear brake 62, a second brake lever (not shown) may also be provided to actuate the other brake. A front and/or forward riding direction or orientation of the bicycle 50 is indicated by the direction of the arrow A in FIG. 1. As such, a forward direction for the bicycle 50 is indicated by the direction of arrow A.

While the illustrated bicycle 50 depicted in FIG. 1 is a road bike having drop-style handlebars 68, the present disclosure may be applicable to bicycles of any type, including mountain bikes with full or partial suspensions.

The drivetrain 58 has a chain C and a front sprocket assembly 72, which is coaxially mounted with a crank assembly 74 having pedals 76. The drivetrain 58 also includes a rear sprocket assembly 78 coaxially mounted with the rear wheel 56 and a rear gear change mechanism, such as a rear derailleur 80.

Figure 2:
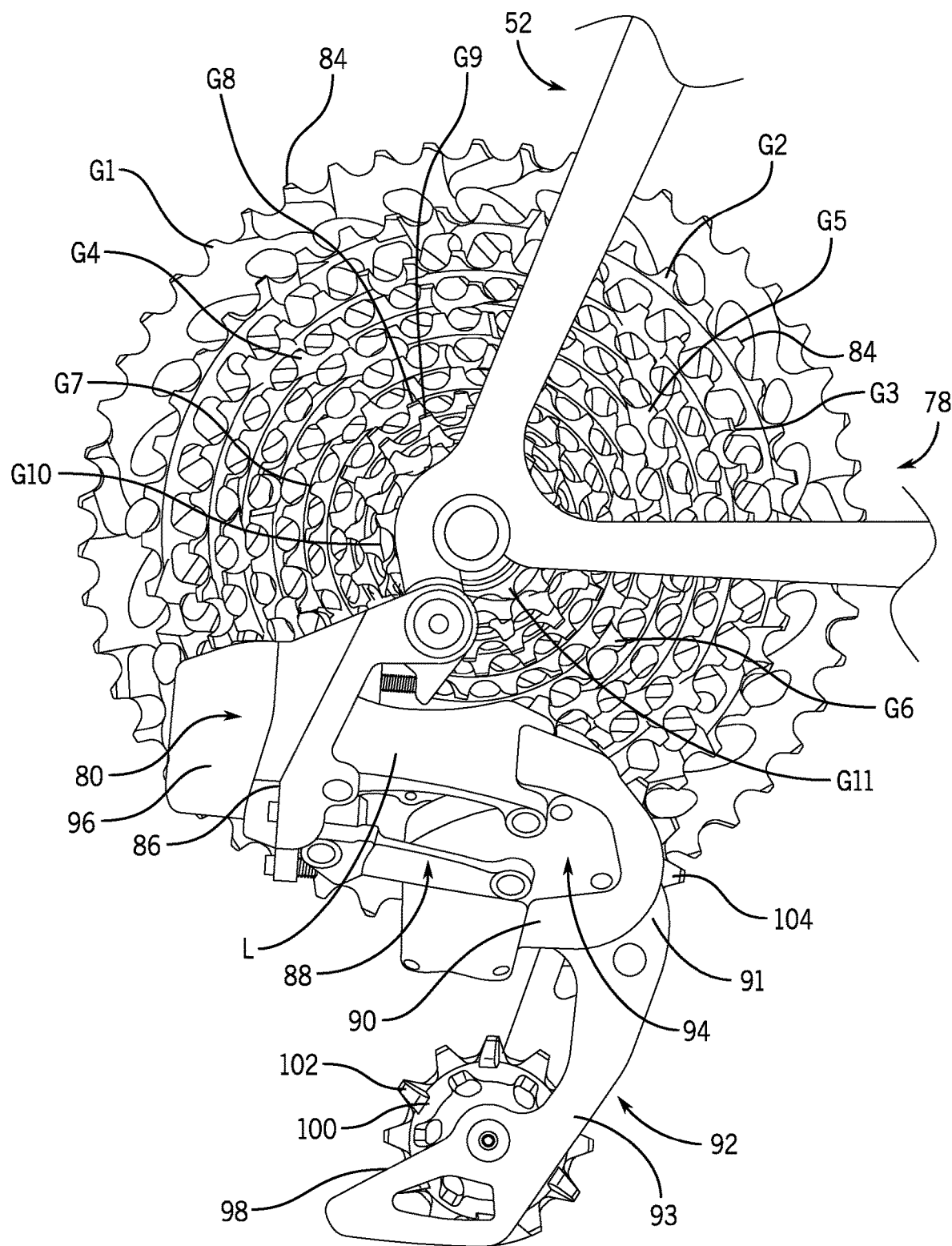
FIG. 2 is a close-up side view of one example of an electronic rear derailleur mounted to a bicycle.
Figure 3:
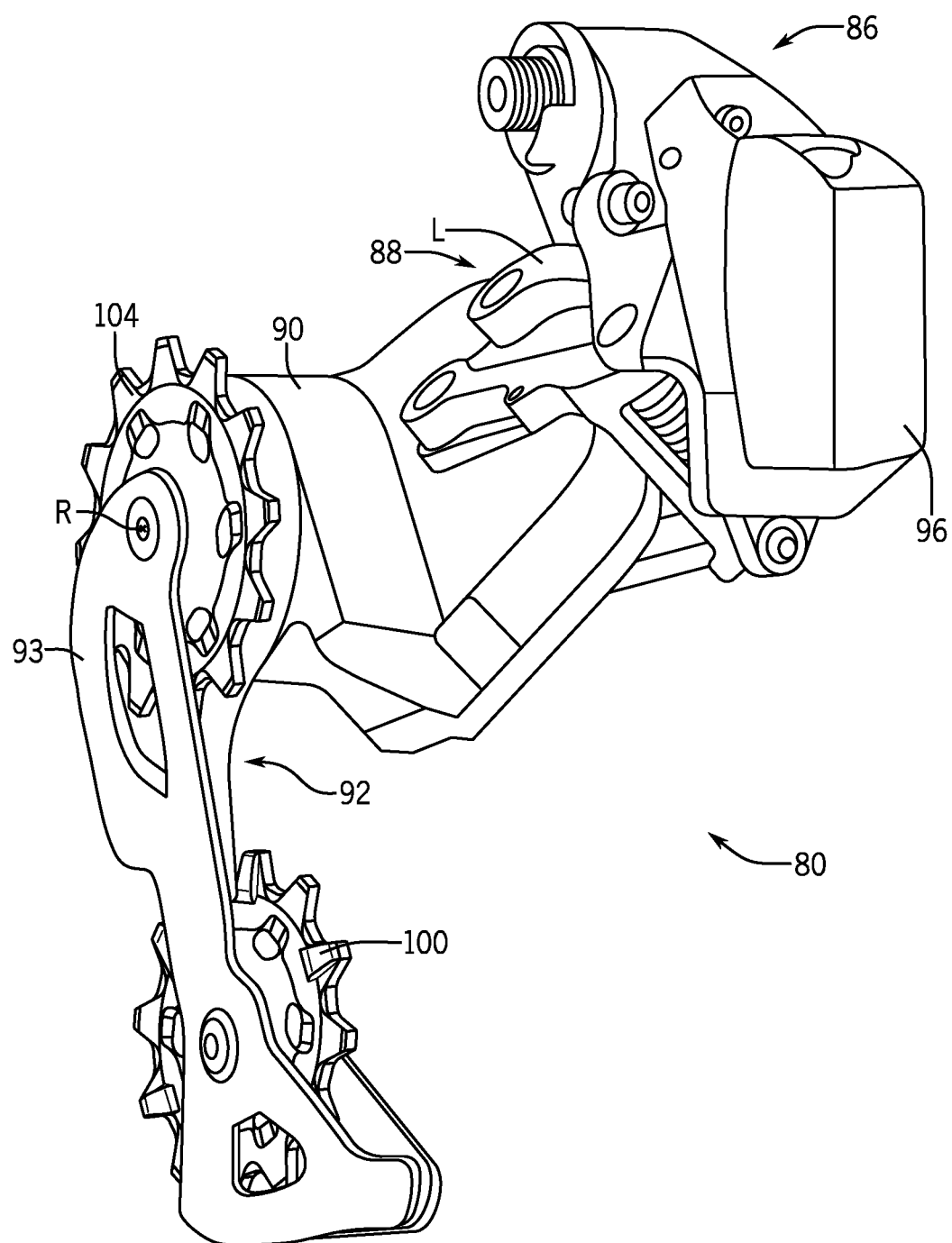
FIG. 3 is a first perspective view of one example of an electronic rear derailleur with a power supply installed.
Figure 4:
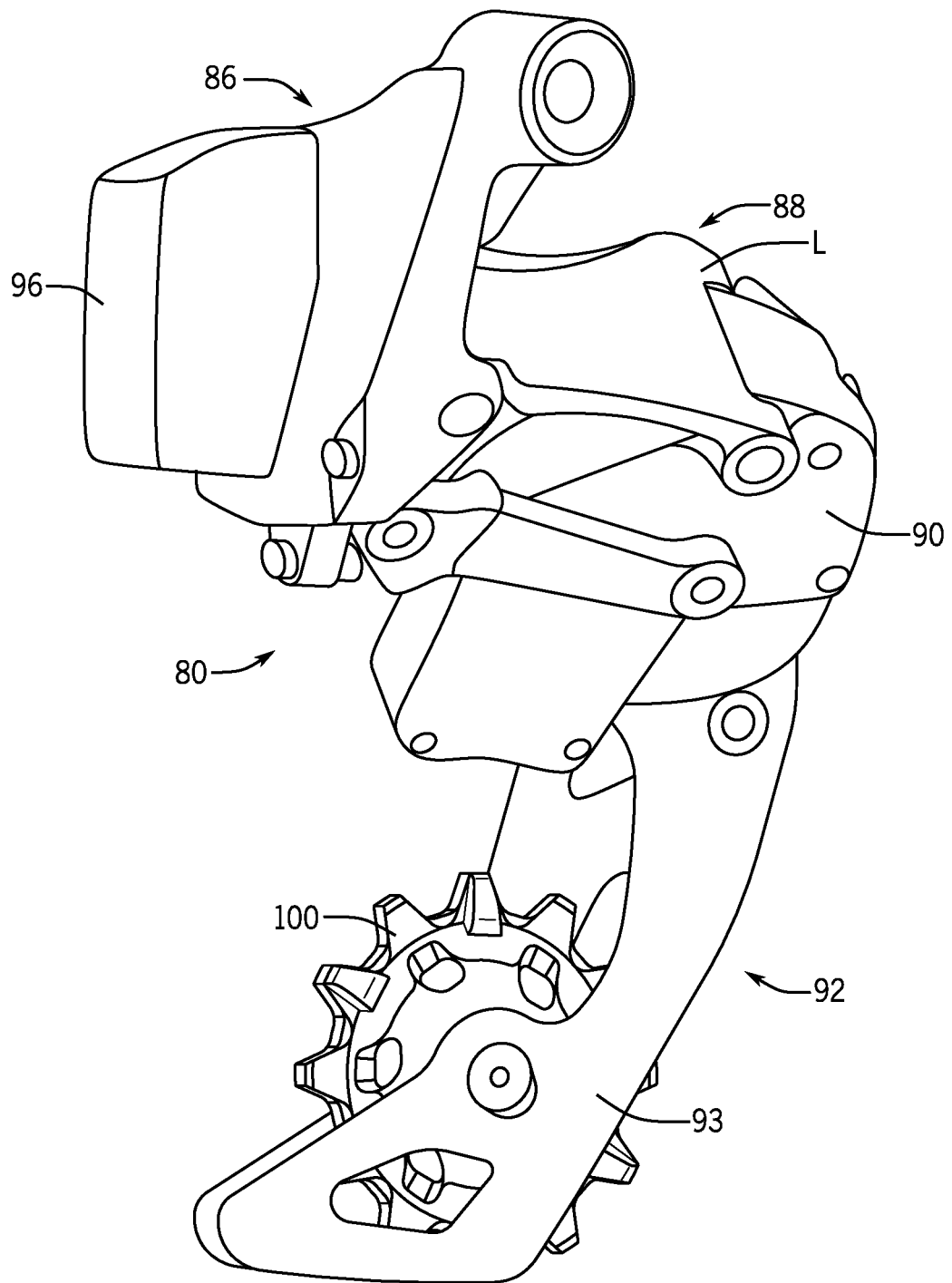
FIG. 4 is a second perspective view of one example of an electronic rear derailleur with a power supply installed.
Figure 5:
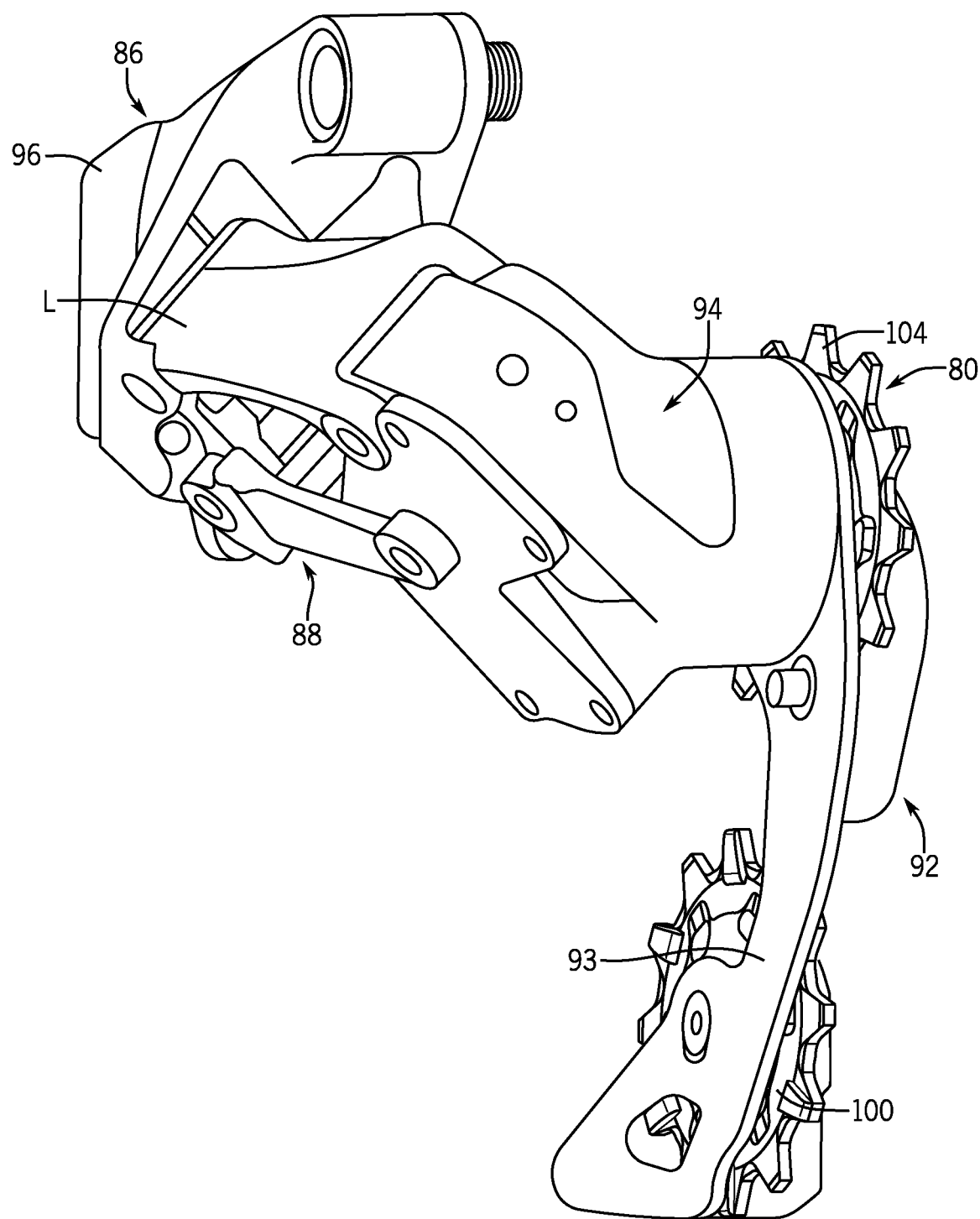
FIG. 5 is a third perspective view of one example of an electronic rear derailleur with a power supply installed.
Figure 6:
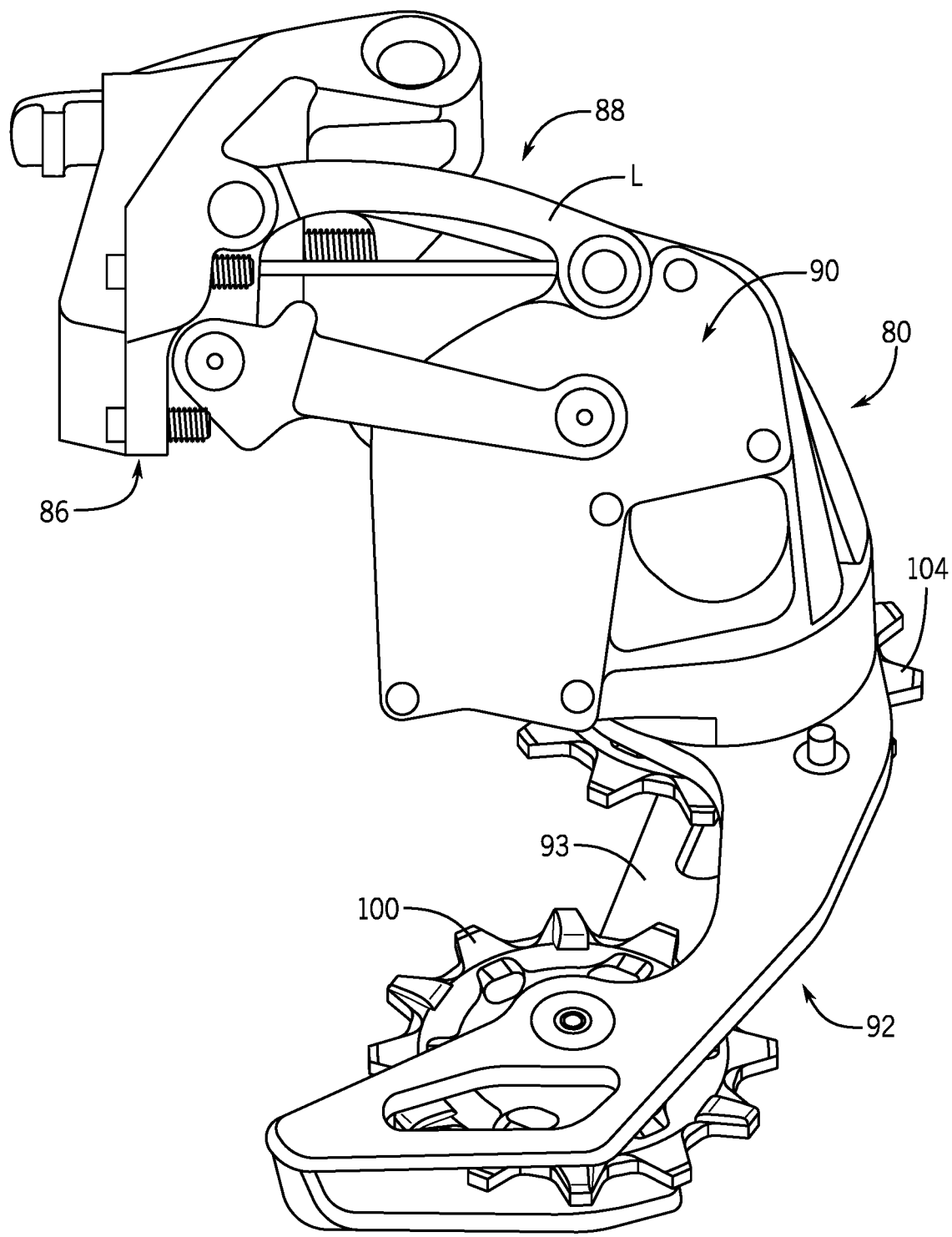
FIG. 6 is a fourth perspective view of one example of an electronic rear derailleur without a power supply installed.
Figure 7:
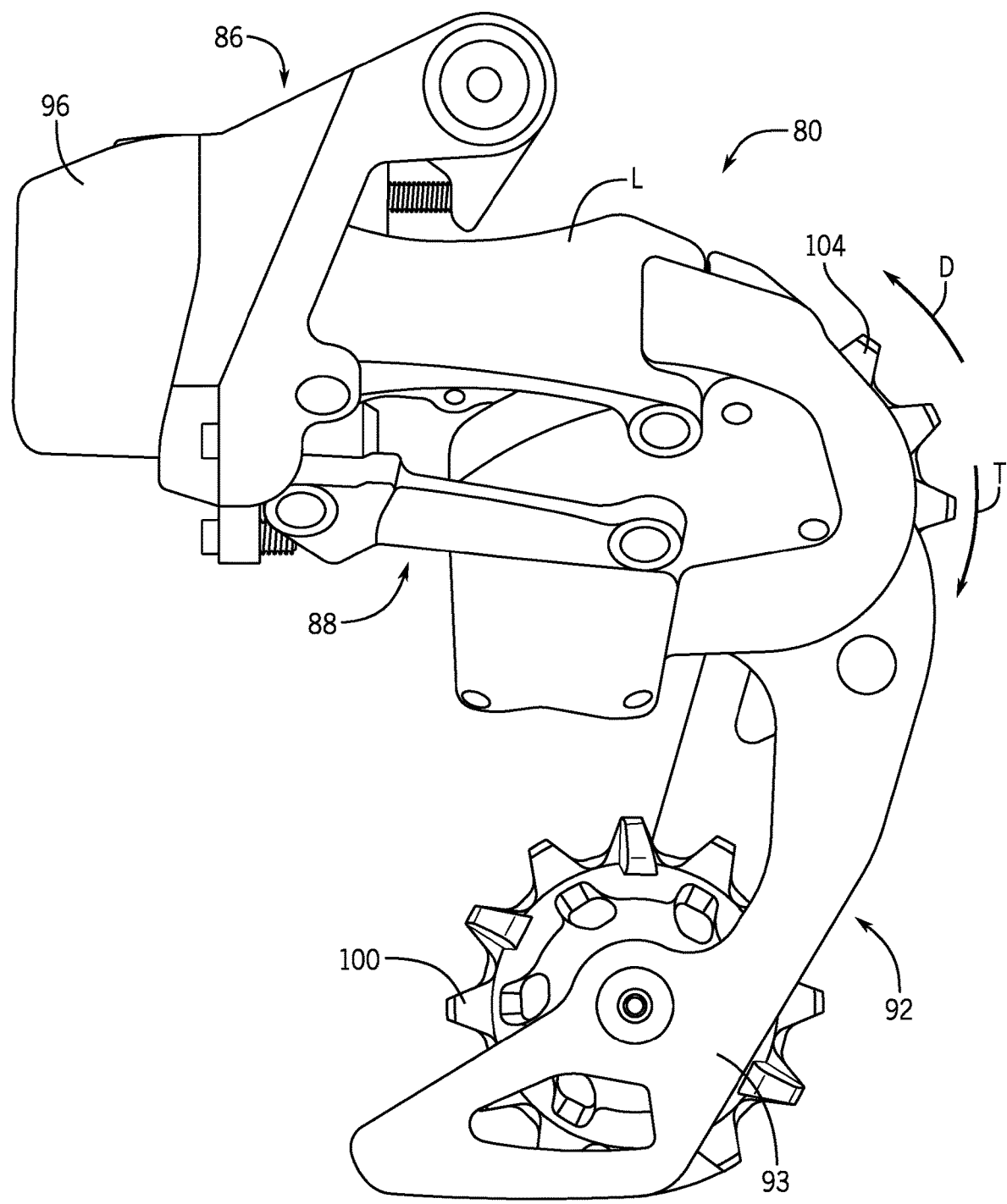
FIG. 7 is a first side view of one example of an electronic rear derailleur with a power supply installed.
Figure 8:
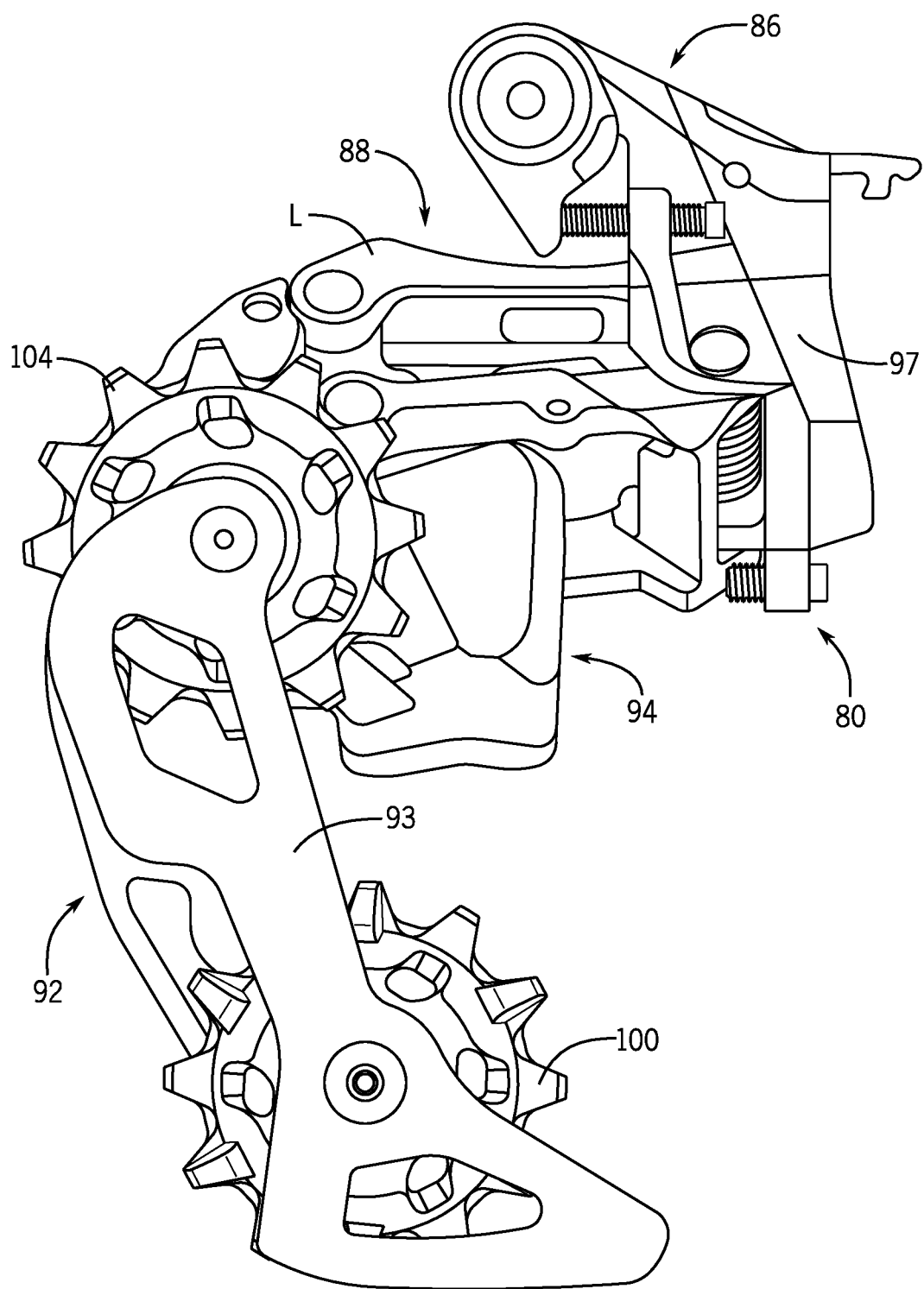
FIG. 8 is a second side view of one example of an electronic rear derailleur without a power supply installed.
Figure 9:
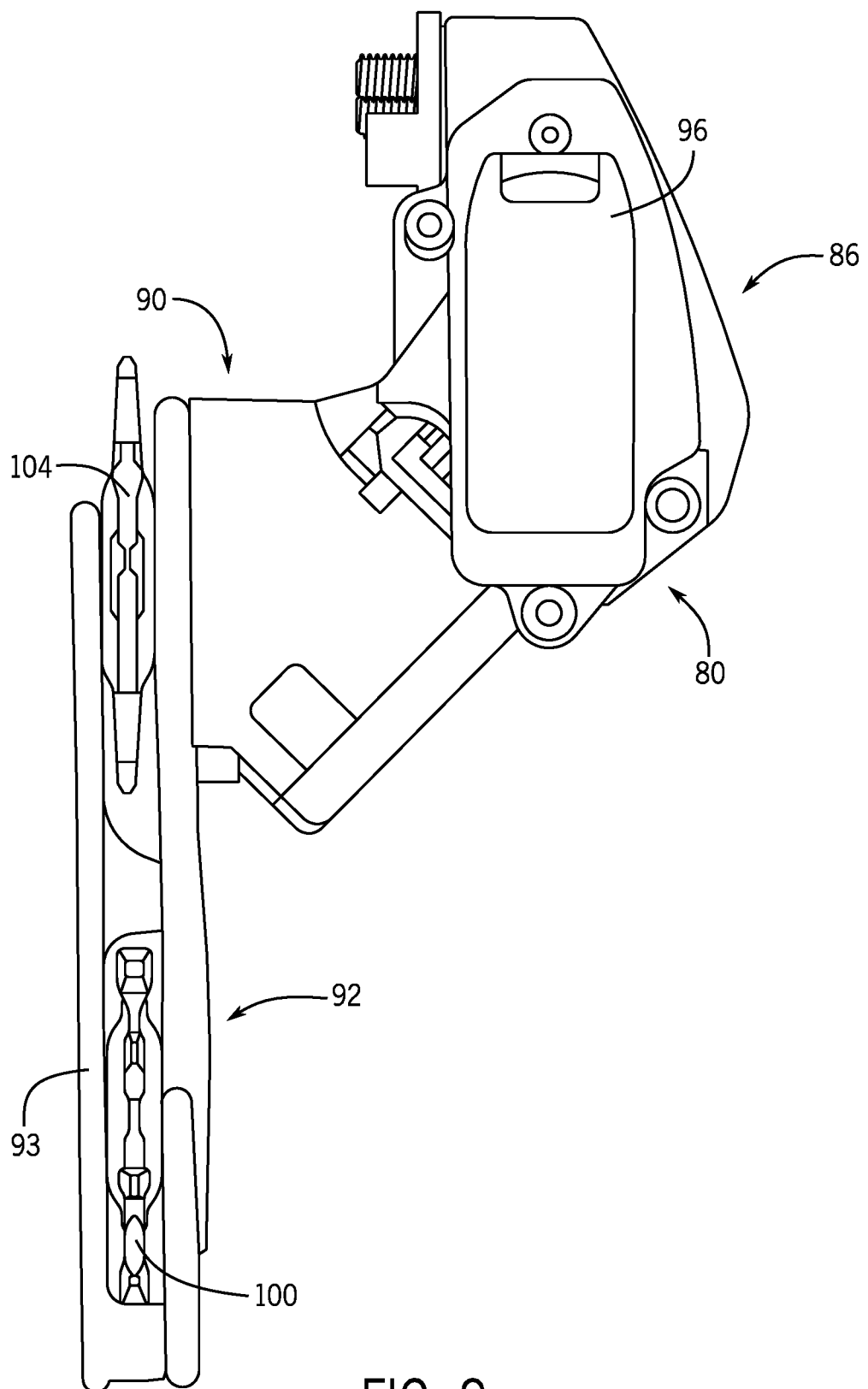
FIG. 9 is a third side view of one example of an electronic rear derailleur with a power supply installed.
Figure 10:
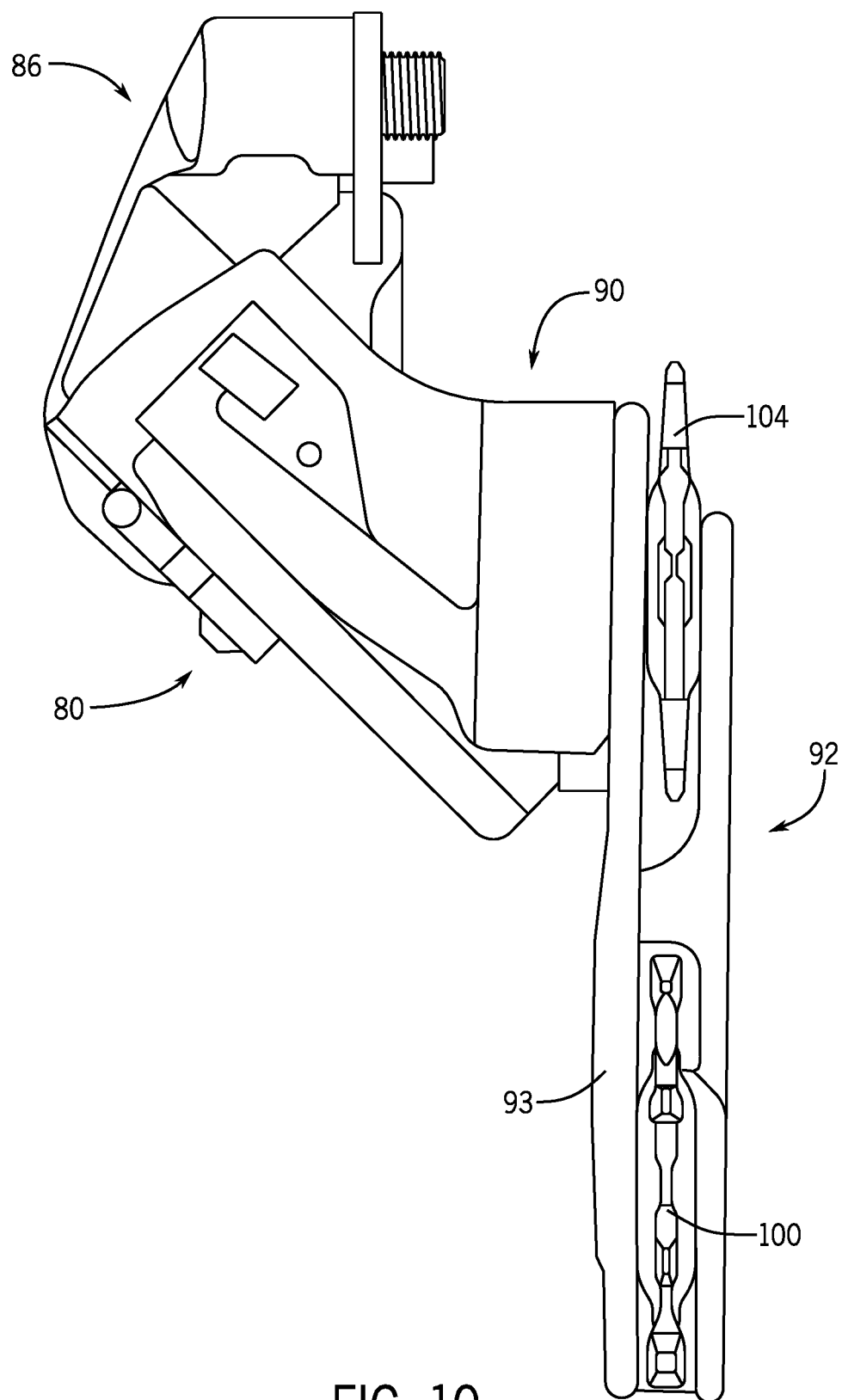
FIG. 10 is a fourth side view of one example of an electronic rear derailleur.

As is illustrated in FIG. 1, the front sprocket assembly 72 may include one or more coaxially mounted chain rings, gears, or sprockets. In this example, the front sprocket assembly 72 has two such sprockets, F1 and F2, each having teeth 82 around a respective circumference. As shown in FIGS. 1 and 2, the rear sprocket assembly 78 may include a plurality (e.g., eleven) of coaxially mounted gears, cogs, or sprockets G1-G11. Each sprocket G1-G11 also has teeth 84 arranged around a respective circumference. The number of teeth 82 on the smaller diameter front sprocket F2 may be less than the number of teeth on the larger diameter sprocket F1. The numbers of teeth 84 on the rear sprockets G1-G11 may gradually decrease from the largest diameter rear sprocket G1 to the smallest diameter sprocket G11. Though not described in any detail herein, a front gear changer 85 may be operated to move from a first operating position to a second operating position to move the chain C between the front sprockets F1 and F2. Likewise, the rear derailleur 80 may be operable to move between eleven different operating positions to switch the chain C to a selected one of the rear sprockets G1-G11. In an embodiment, the rear sprocket assembly 72 may have more or fewer sprockets. For example, in an embodiment, a rear sprocket assembly may have twelve or thirteen sprockets. Dimensions and configuration of the rear derailleur 80 may be modified to accommodate a specific implemented plurality of sprockets. For example, an angle and length of the linkage and/or the configuration of the cage of the derailleur may be modified to accommodate specific sprocket combinations.

Referring to FIGS. 2-10, the rear derailleur 80 is depicted in these examples as a wireless, electrically actuated rear derailleur mounted or mountable to the frame 52, or frame attachment, of the bicycle 50. The electric rear derailleur 80 has a base member 86 (e.g., a b-knuckle) that is mounted to the bicycle frame 52. A linkage 88 has two links L that are pivotally connected to the base member 86 at a base member linkage connection portion. A movable member 90 (e.g., a p-knuckle) is connected to the linkage 88 at a moveable member linkage connection portion 95. A chain guide assembly 92 (e.g., a cage) is configured to engage and maintain tension in the chain C and has one or more cage plates 93 with a proximal end 91 that is pivotally connected to a part of the movable member 90. The cage plate 93 rotates or pivots about a cage rotation axis R. The base member 86 includes multiple parts, such as a first portion and a second portion, described further herein. The first portion and the second portion of the base member are coupled to each other, and together form the external surface 97 of the base member 86. The external surface and the individual portions include sides, a number of which form the external surface 97.

The derailleur 80 includes a motor module 94 and a power supply, such as the shown battery 96. The power supply, or the battery 96, supplies power to the motor module 94. In one example, as illustrated in FIG. 2, the motor module 94 is located in the movable member 90. However, the motor module 94 may instead be located elsewhere, such as in one of the links L of the linkage 88 or in the base member 86. The motor module 94 may include a gear mechanism or transmission. As is known in the art, the motor module 94 and gear mechanism may be coupled with the linkage 88 to laterally move the cage plate 93 and thus switch the chain C among the rear sprockets (e.g. G1-G11) on the rear sprocket assembly 78.

The cage plate 93 also has a distal end 98 that carries a tensioner cog or wheel 100. The wheel 100 also has teeth 102 around a circumference. The cage plate 93 is biased in the chain tensioning direction T to maintain tension in the chain C. The chain guide assembly 92 may also include a second cog or wheel, such as a guide wheel 104 disposed nearer the proximal end 91 of the cage plate 93 and the movable member 90. In operation, the chain C is routed around one of the rear sprockets (e.g. G1-G11). An upper segment of the chain C extends forward to the front sprocket assembly 72 and is routed around one of the front sprockets F1 or F2. A lower segment of the chain C returns from the front sprocket assembly 72 to the tensioner wheel 100 and is then routed forward to the guide wheel 104. The guide wheel 104 directs the chain C to the rear sprockets (e.g. G1-G11). Lateral movement of the cage plate 93, tensioner wheel 100, and guide wheel 104 may determine the lateral position of the chain C for alignment with a selected one of the rear sprockets (e.g. G1-G11).

One or more control units 71 may be mounted to the handlebars 68 for actuating the motor module 94 and operating the rear derailleur 80 for executing gear changes and gear selection. The control unit 71, however, may be located anywhere on the bicycle 50 or, alternatively, may be distributed among various components of the bicycle 50, with routing of a communication link to accommodate necessary signal and power paths. The control unit may also be located other than on the bicycle 50, such as, for example, on a rider's wrist or in a jersey pocket. The communication link may include wires, may be wireless, or may be a combination thereof. In one example, the control unit may be integrated with the rear derailleur 80 to communicate control commands between components. The control unit may include a processor, communication device (e.g. a wireless communication device), a memory, and one or more communication interfaces.

The battery 96 may instead be an alternate power supply or power source and may operate other electric components of the bicycle 50 within a linked system. Further, multiple power supplies may be provided, which may collectively or individually power the electric components of the system, including the rear derailleur 80, such as a drive motor for an embodiment involving an electrically powered bicycle. Additional batteries or other power supplies may be attached to the derailleur or located at other positions, such as the frame 52. In this example, however, the battery 96 is configured to be attached directly to the rear derailleur 80, and to provide power to the components of the rear derailleur 80. In an embodiment, the rear derailleur is configured such that the battery 96 provides power to only the components of the rear derailleur 80.

Figure 11A:
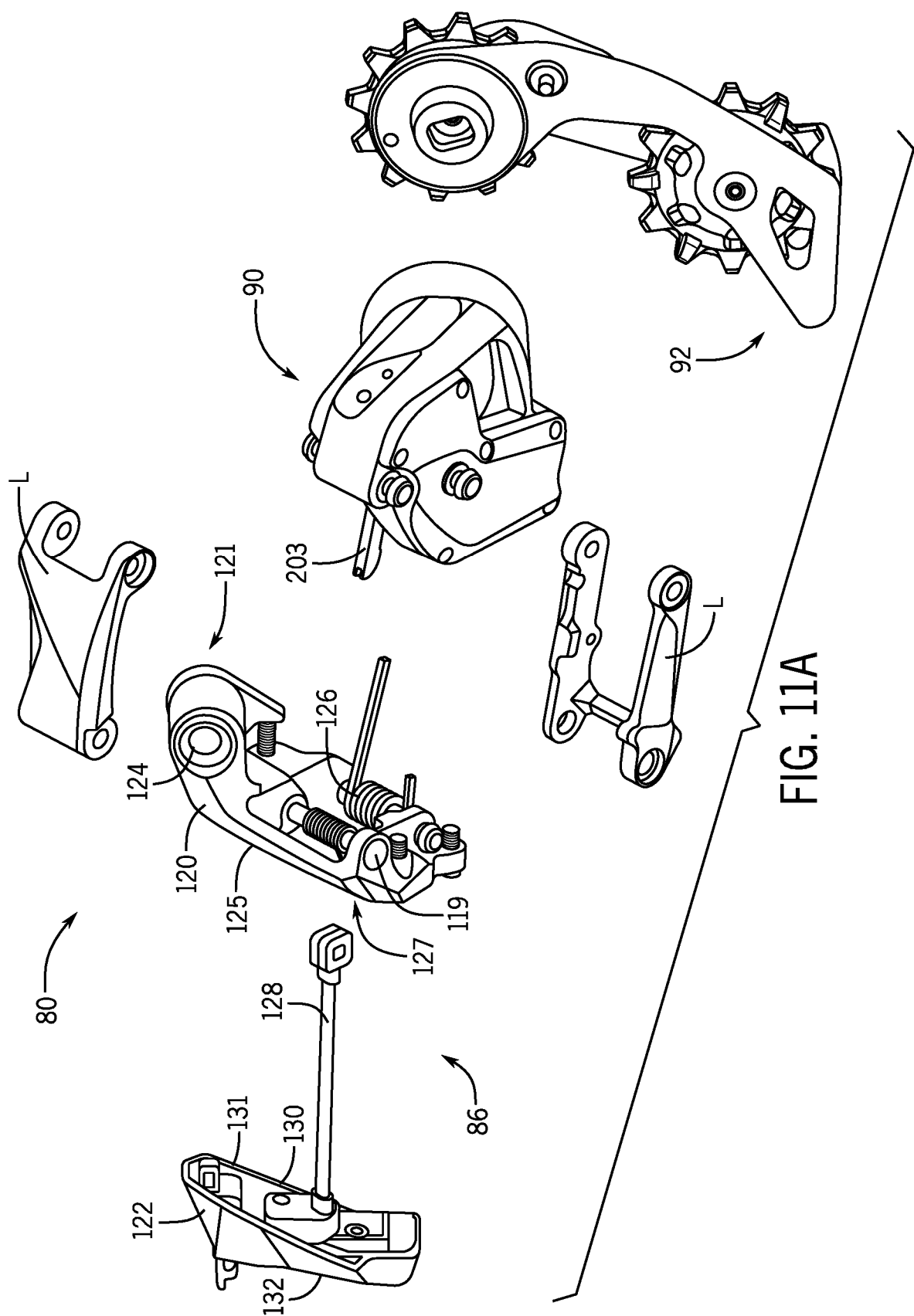
FIG. 11A is an exploded perspective view of one example of an electronic rear derailleur.
Figure 11B:
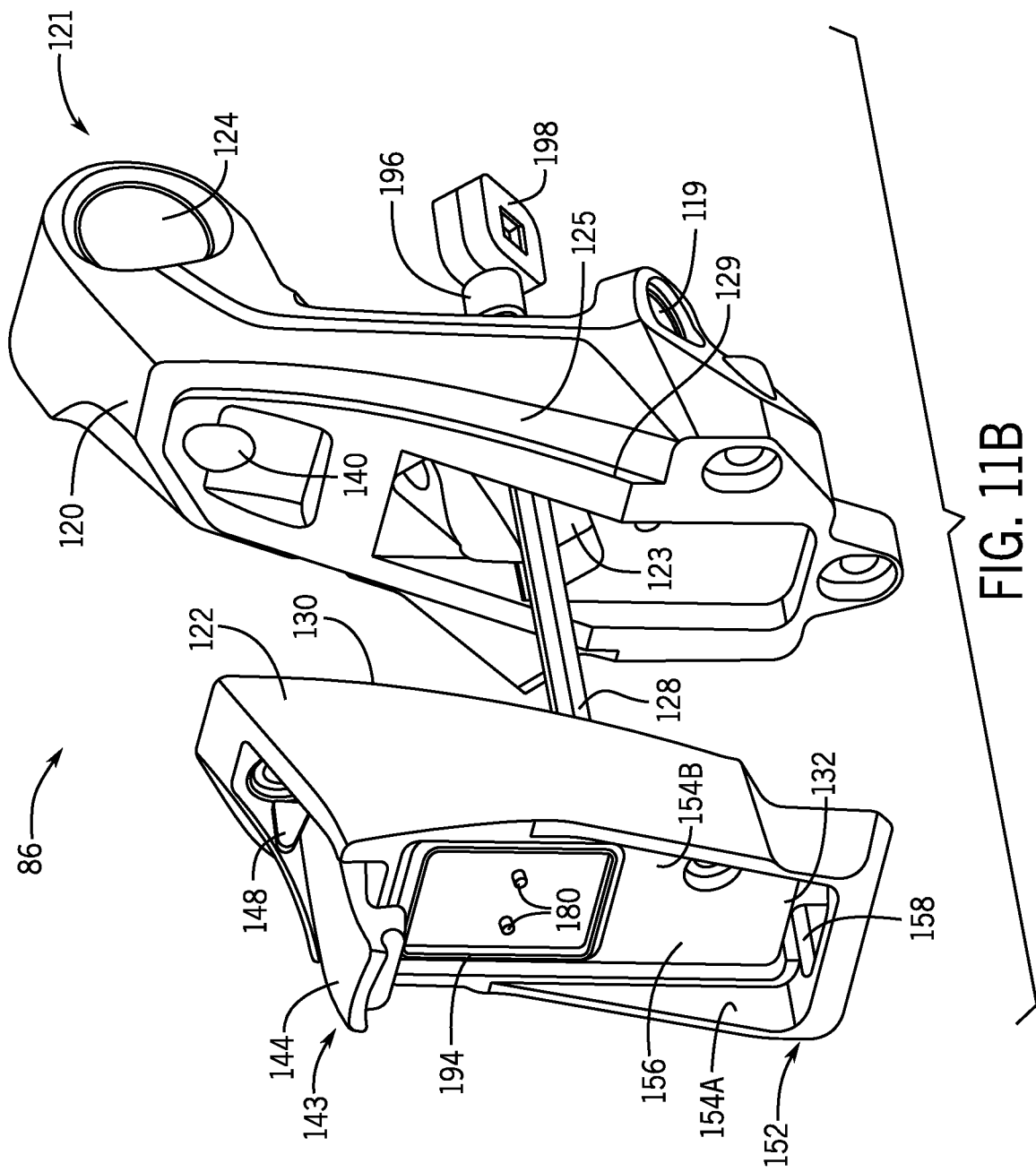
FIG. 11B is an exploded perspective view of the multiple part base member of the electronic rear derailleur of FIG. 11A.

Referring to FIG. 11A, as discussed above, the rear derailleur 80 includes the base member 86, the movable member 90 movably coupled to the base member 86 via links L, and the chain guide assembly 92 rotatably coupled to the movable member 90. The base member 86 includes a first portion 120 and a second portion 122, as are shown in more detail in FIG. 11B. The first portion 120 of the base member 86 is mountable to the frame 52 of the bicycle 50, for example. The first portion 120 of the base member 86 is mountable to the frame 52 of the bicycle 50, for example, with one or more connectors or frame connector or attachment portions 121. For example, the first portion 120 of the base member 86 is mountable to the frame 52 of the bicycle 50 with a mounting bolt via a through-hole 124 of the first portion 120 of the base member 86.

The first portion 120 of the base member 86 includes one or more biasing members 126 operable to bias the links L, and thus the movable member 90 and the chain guide assembly 92, towards a position relative to the base member 86. For example, the first portion 120 of the base members 86 includes at least one biasing member 126 embodied as a torsional spring. More or fewer biasing members and different types of biasing members may be provided. In an embodiment, one or more biasing members 126 are coupled with a drive element or arm 203 in a manner that facilitates a gear-train clutch, thus disengaging the gear-train if the moveable member 90 is moved due to external forces.

The second portion 122 of the base member 86 includes a cable 128 extending away from the second portion 122 of the base member 86 and towards the first portion 120 of the base member 86. The cable 128 is, for example, a flexible electrical cable that extends from the second portion 122 of the base member 86, through or around the first portion 120 of the base member 86, to the chain guide assembly 92. For example, the cable 128 extends through an opening 123 in the first portion 120 of the base member 86 between or around pins of the linkage connecting the linkage to the first portion 120 of the base member.

In one example, the first portion 120 of the base member 86 and the second portion 122 of the base member 86 are made of different materials. For example, the first portion 120 of the base member 86 may be made of metal (e.g., aluminum), and the second portion 122 of the base member 86 may be made of plastic (e.g., glass filled nylon). Other materials may be used. The first portion 120 of the base member 86 and the second portion 122 of the base member 86 may be manufactured in different ways. For example, the first portion 120 of the base member 86 may be manufactured with forging and machining, and the second portion 122 of the base member 86 may be manufactured with injection molding. The second portion 122 of the base member 86 being made of plastic reduces the weight, the cost, and the difficulty in manufacturing the base member 86 compared to the prior art.

Figure 12:
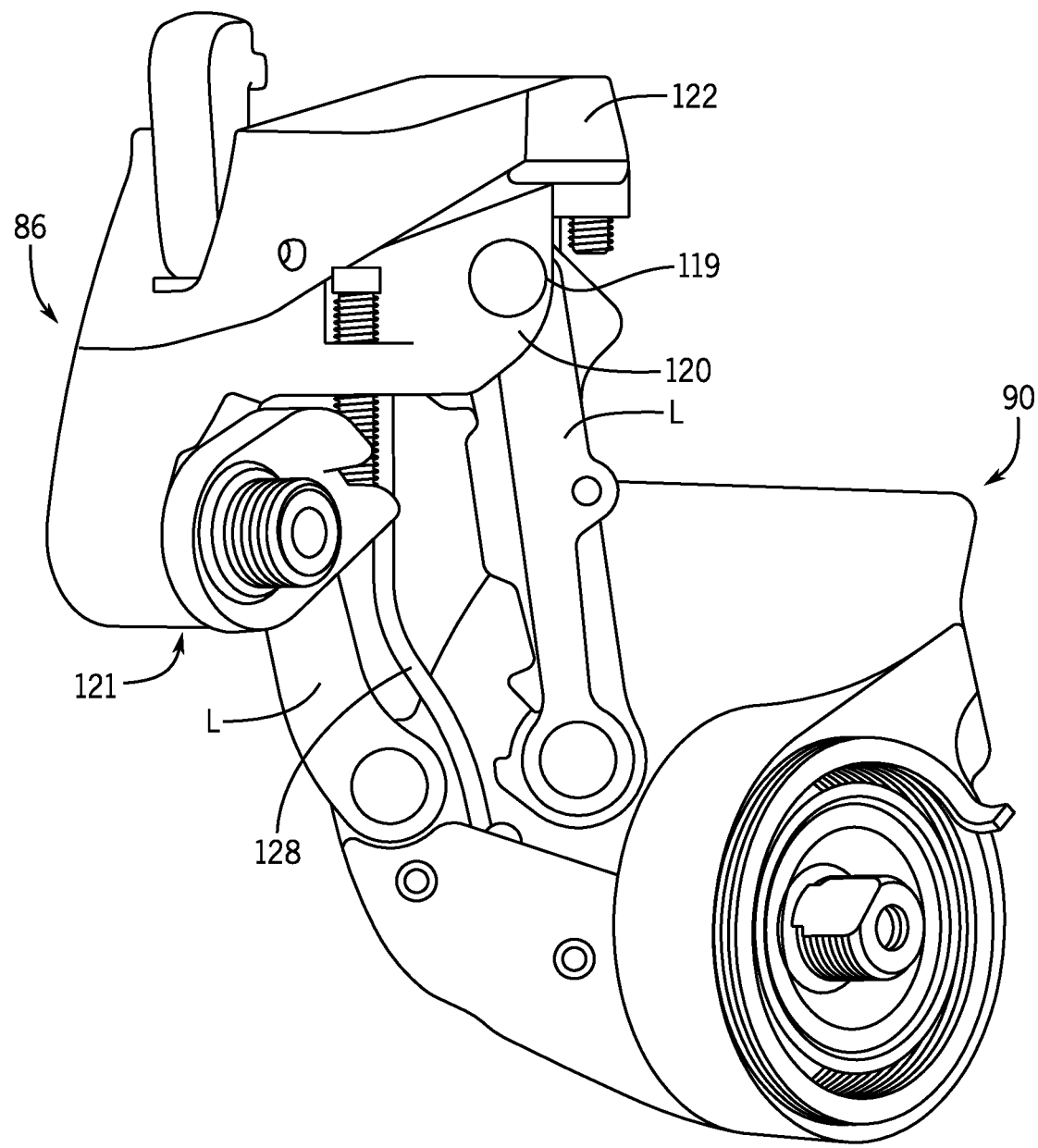
FIG. 12 is a perspective view of one example of a portion of an electronic rear derailleur without a power supply installed.

Referring to FIG. 12, the cable 128 electrically connects a power supply, such as the battery 96 that is electrically connectable at the second portion 122 of the base member 86 to a component of the movable member 90. For example, as discussed further below, the cable 128 electrically connects the power supply electrically connectable at the second portion 122 of the base member 86 with a printed circuit board (PCB) 204 supported within the movable member 90. In other examples, the cable 128 may electrically connect the power supply with a component within the first portion 120 of the base member 86, one of the links L, or the chain guide assembly 92 instead of the movable member 90. Other cables may be provided to electrically connect the power supply with components within the rear derailleur 80 in addition to or instead of the cable 128 electrically connecting the power supply and the PCB of the movable member 90.

Referring to FIGS. 13 and 14, the second portion 122 of the base member 86 is removably coupled to the first portion 120 of the base member 86. The second portion 122 of the base member 86 has a first side 130, a second side 132 at a distance from and opposite the first side 130, and at least one third side 134 extending between the first side 130 and the second side 132. When the second portion 122 of the base member 86 is coupled to the first portion 120 of the base member 86, the first side 130 of the second portion 122 of the base member 86 abuts the first portion 120 of the base member 86. The first portion 120 includes a side including a surface 125 configured to mate and/or otherwise interface with the second part 122, for example with a mating surface 131 of the first side 130 of the second portion 122.

In an embodiment, the bass member of the electronic rear derailleur includes multiple parts, for example a first portion 120 and a second portion 122. The first portion 120 includes a frame attachment portion 121 and a mating portion 127. The mating portion 127 is configured to mate with a corresponding first side 130 of the second portion 122. For example, the mating portion 127 of the first portion 120 includes a surface configured to mate with a corresponding mating surface 131 of the second portion 122. The second portion 122 includes such a mating or first side 130 and a power supply attachment 143 with one or more power supply attachment features, as well as an electrical cable 128 configured to be disposed through the first portion 120, for example through an unsealed hole in the first portion 120. In an embodiment, the mating portion 127 of the first portion 120 includes a protruding part 129. The protruding part 129 may have an outer perimeter configured to align with corresponding features of the first side 130 of the second portion 122 to secure and/or align the second portion 122 with the first portion 120.

The second portion 122 of the base member 86 is removably coupled to the first portion 120 of the base member 86 in any number of ways including, for example, with one or more fasteners 136. In the examples shown in FIGS. 13-17, the second portion 122 of the base member 86 is removably coupled to the first portion 120 of the base member 86 with two fasteners 136. More or fewer fasteners 136 may be used to removably couple the second portion 122 of the base member 86 to the first portion 120 of the base member 86. The second portion 122 of the base member 86 may be removably coupled to the first portion 120 of the base member 86 in any number of other ways.

The first portion 120 also may include a linkage attachment portion 119, configured for attachment to the linkage. For example, the linkage attachment portion 119 may include bores or holes for the insertion of pivots or other structure of the linkage.

In the examples shown in FIGS. 13-17, the two fasteners 136 are screws. The two screws 136 extend through corresponding openings 138 (e.g., through-holes) through the second portion 122 of the base member 86, into corresponding bores 140 in the first portion 120 of the base member 86. The bores 140 are, for example, threaded and engage with the two screws 136, respectively.

The second portion 122 of the base member 86 includes any number of first alignment features 142 at or adjacent to the first side 130 of the second portion 122 of the base member 86. At least some of the first alignment features 142 help facilitate positioning of the second portion 122 of the base member 86 relative to the first portion 120 of the base member 86 for the mounting of the second portion 122 of the base member 86 to the first portion 120 of the base member 86. Alternatively or additionally, at least some of the first alignment features 142 help prevent translation and/or rotation of the second portion 122 of the base member 86 relative to the first portion 120 of the base member 86. For example, bore 140a, into which screw 136a extends, is a stepped bore, and first alignment feature 142a is positioned within a portion of the stepped bore 140a to facilitate relative positioning and prevent translation movement of the second portion 122 of the base member 86 relative to the first portion 120 of the base member 86. The first alignment feature 142a may be a boss that is cylindrically shaped. Other types of first alignment features may be provided for relative positioning and/or relative movement prevention. For example, flanges, tabs, channels, and other extensions may be used as other alignment features. Additionally, the first portion 120 of the base member 86 (e.g., the bores 140 in the first portion 120 of the base member 86) may include touch offs or other features to, for example, aid in relative positioning and/or relative movement prevention, and allow for manufacturing tolerances.

The base member 86 also includes the power supply attachment 143 including at least one power supply attachment feature. The second portion 122 of the base member 86 includes at least a portion of the power supply attachment 143, including at least one power supply attachment feature. The portion of the power supply attachment 143 and features thereof include, for example, a battery retaining member 144 that is rotatably attached to the second portion 122 of the base member 86. The battery retaining member 144 may be rotatably attached to the second portion 122 of the base member 86 with, for example, a shaft 145. Different locking action may be provided within the power supply attachment 143 to retain the power supply, such as the battery 96 on the second portion 122 of the base member 86.

Figure 17:
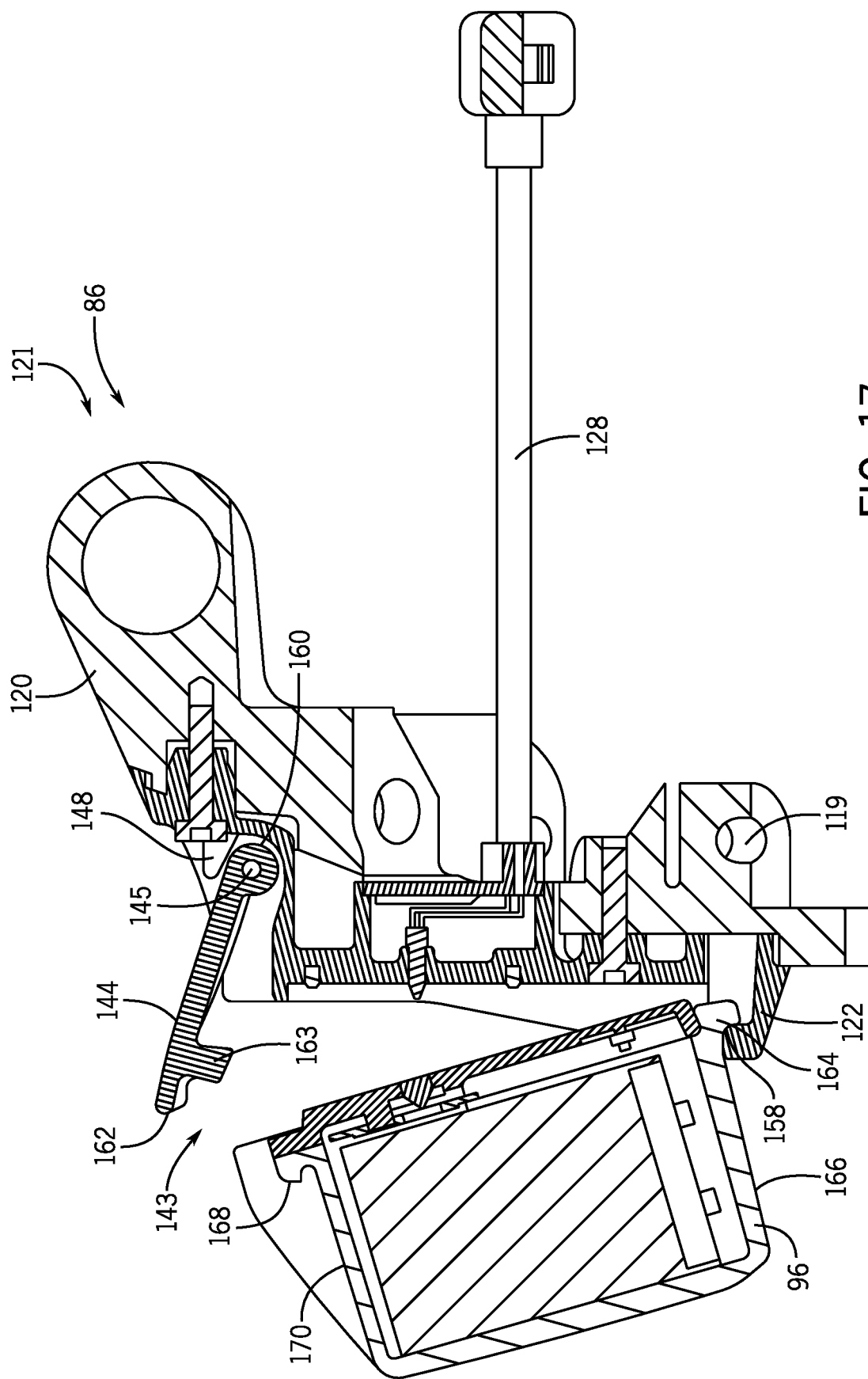
FIG. 17 is a cross-section view taken along line 16 of the base member of FIG. 15, with a power supply being installed.

The battery retaining member 144 may be a latch that is rotatably attached to the second portion 122 of the base member 86. The latch 144 is rotatable between a first rotational position relative to the second portion 122 of the base member 86 (as illustrated in FIG. 16) and a second rotational position relative to the second portion 122 of the base member 86 (as illustrated in FIG. 17). The first rotational position of the latch 144 relative to the second portion 122 of the base member 86 is defined by a surface 146 of the second portion 122 of the base member 86, and the second rotational position of the latch 144 relative to the second portion 122 of the base member 86 is defined by one or more stops 148 in the exterior surface of the base member 86. For example, the base members 86 of the examples shown in FIGS. 13-19 include two stops extending from the surface 146. More or fewer stops may be provided.

FIG. 17 illustrates the stops 148 preventing over-rotation of the latch 144 relative to the second portion 122 of the base member 86. By limiting an angular range through which the latch 144 may rotate relative to the second portion 122 of the base member 86, a power supply 150 may not be installed incorrectly. In other words, the stops 148 prevent a user from installing the power supply 150 with reversed polarity.

The power supply 150 may be any number of different types of power supplies including, for example, a rechargeable Lithium Ion battery. Other types of power supplies may be used.

Figure 19:
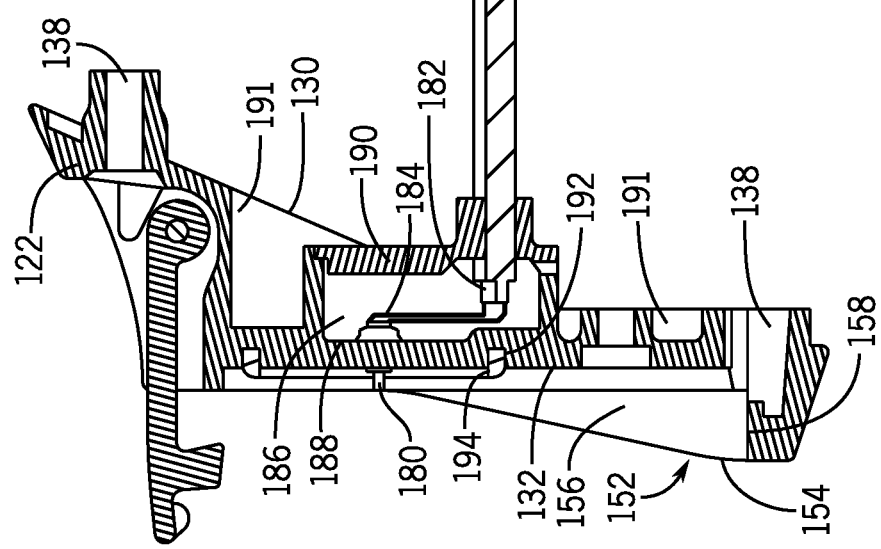
FIG. 19 is a cross-section view taken along line 18 of the portion of the base member of FIG. 18.
Figure 18:
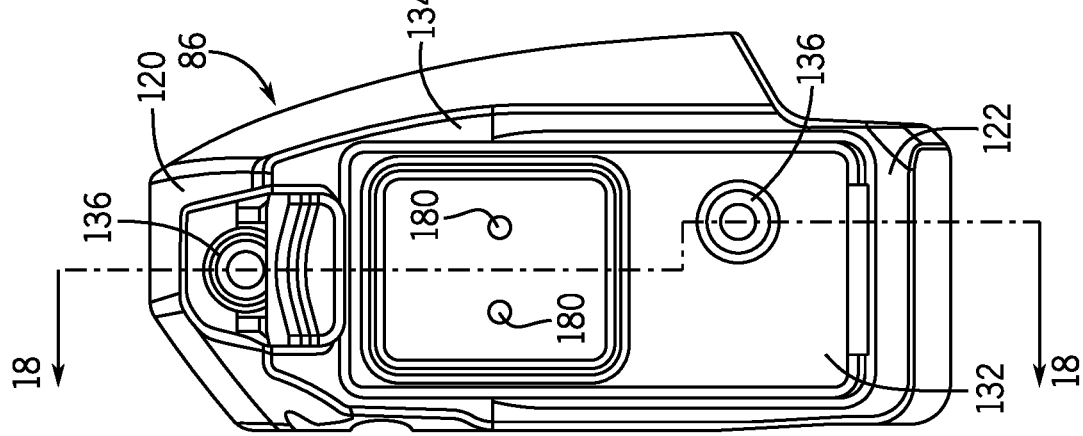
FIG. 18 is a side view of a portion of a base member in accordance with the teachings of the present disclosure, without a power supply installed.

With reference to FIGS. 18 and 19, second alignment features 152 help facilitate the positioning of the power supply 150 on the second side 132 of the second portion 122 of the base member 86. The second alignment features 152 are located at or adjacent to the second side 132 of the second portion 122 of the base member 86. For example, the second alignment features 152 include at least one protrusion 154 (e.g., wall) extending away from the second side 132 of the second portion 122 of the base member 86. The wall 154, or walls, at least partially forms a recess 156 into which the power supply 150 is positionable. In an embodiment, two walls 154A and 154B are spaced apart a lateral distance to form the lateral power supply alignment features.

The second alignment features 152 may include additional tabs, flanges, lips, ribs, and/or other structure. In an embodiment, the second alignment features 152 may be power supply alignment features and/or power supply attachment features. For example, the second alignment features 152 may interact with sides or surfaces of the power supply 150 to align power supply electrical contacts laterally with electrical contacts (e.g. pins, as described further below) of the second portion 122 of the base member 86. The second alignment features 152 may include a protrusion forming a surface configured to interface with a corresponding surface of the power supply 150, for example. In an embodiment, the surface is a wall 154. The second alignment features 152 may also include vertical alignment and/or securing features. In one example, the wall 154 includes a lip 158, under which a portion of the power supply 150 is positionable to aid in the securing of the power supply 150 to the second portion 122 of the base member 86.

With reference to FIG. 17, the latch 144 has a first end 160 and a second end 162. The latch 144 is rotatably attached to the second portion 122 of the base member 86 at or adjacent to the first end 160 of the latch 144. The latch 144 includes a locking member 163 that extends away from a surface of the latch 144 at or adjacent to the second end 162 of the latch 144. The locking member 163 may be a tab or flange extending away from the surface of the latch 144.

A portion of the power supply attachment 143 may be disposed on the power supply 150. For example, the power supply 150 includes a flange 164 at a first side 166 of the power supply 150, and a securing catch 168 at a second side 170 of the power supply 150. The securing catch 168 may be a tab, a flange, or another structure. When the power supply 150 is installed on the second portion 122 of the base member 86, the flange 164 of the power supply 150 is positioned under the lip 158, and the latch 144 is rotated into a rotational position relative to the second portion 122 of the base member 86 in which the locking member 163 engages with the securing catch 168. The power supply 150 may be installed and retained on the second portion 122 of the base member 86 in other ways. In one example, the first portion 120 of the base member 86 includes a securing catch instead of the power supply 150, and the locking member 163 of the latch 144 extends over the top of the power supply 150 when the power supply is positioned within, for example, the second alignment features 152 at the second side 132 of the second portion 122 of the base member 86

With reference to FIGS. 18 and 19, the second portion 122 of the base member 86 includes at least one electrical contact 180 extending away from a surface of the second portion 122 of the base member 86. For example, the at least one electrical contact extends away from a surface of the second portion 122 of the base member 86 at least partially defining the recess 156 (e.g., the second side 132 of the second portion 122 of the base member 86). In the example shown in FIG. 19, the at least one electrical contact 180 extends through the second portion 122 of the base member 86.

The at least one electrical contact 180 may be any number of different types of electrical contacts. For example, as shown in the example of FIG. 18, the at least one electrical contact 180 includes two electrically conductive pins. The two electrically conductive pins 180 may be made of any number of materials including, for example, copper. The two electrically conductive pins 180 may, for example, be press fit in the second portion 122 of the base member 86 (e.g., in openings through the second portion 122 of the base member 86). In one example, the pins 180, for example, extend from the second side 132 of the second portion 122 of the base member 86, and a portion of the cable 128 (e.g., a portion of the wires included within the cable 128) extends through the second portion 122 of the base member 86.

The two electrically conductive pins 180 are physically and electrically connected to a first end 182 of the cable 128. For example, wires 184 included within the cable 128 may be soldered to the two electrically conductive pins 180 on sides of the pins 180 closest to the first side 130 of the second portion 122 of the base member 86. The wires 184 and the first end 182 of the cable 128 may be electrically and physically connected in other ways, including, for example, by crimping.

In one example, the connection between the two pins 180 and the cable 128 is protected with an epoxy 186. For example, the connection between the two pins 180 and the cable 128 is located within a recess 188 at the first side 130 of the second portion 122 of the base member 86. A cover 190 is positioned over the recess 188, and the cable 128 extends through the cover 190. In one example, the cover 190 includes an inlet port (e.g., a fill port) and an outlet port. The recess 188 is filled with the epoxy 186 via the inlet port until the epoxy 186 starts to flow out of the recess 188 via the outlet port, indicating that the recess 188 has been filled, or potted, with the epoxy 186. The cover 190 is fixed to the second portion 122 of the base member 86 with the epoxy 186, and the cover 190 and the epoxy 186 disposed in the recess 188, which forms an epoxy bath, protect the connection between the two pins 180 and the cable 128.

In one example, the first side 130 of the second portion 122 of the base member 86 includes additional recesses 191. The recesses 191 provide weight savings and reduce the cost of manufacturing the second portion 122 of the base member 86, as the recesses 191 reduce the amount of material needed to manufacture the second portion 122 of the base member 86.

An electrical connection between the pins 180 and the power supply 150 may also be protected (e.g., from moisture and dirt). For example, the second side 132 of the second portion 122 of the base member 86 may include a channel 192 that surrounds the pins 180. A sealing element 194 may be disposed within the channel 192. The sealing element 194 is configured to prevent fluid (e.g. water) from interacting with the electrical contacts. The sealing element 194 may be an elastomeric gasket, or other appropriate device. The sealing element 194 may be flexible and may extend above the channel 192 (e.g., above the second side 132 of the second portion 122 of the base member 86. The sealing element 194 may be any number of different types of sealing elements, including, for example, a rubber gasket. The sealing element 194 is compressed and provides a seal when the power supply 150 is installed on the second portion 122 (e.g., within the second alignment features 152) of the base member 86, thus protecting the electrical connection between the pins 180 and the power supply 150.

The second alignment features 152 help align at least one power supply electrical contact (e.g., two power supply electrical contacts) of the power supply 150 with the at least one electrical contact 180 of the second portion 122 of the base member 86 when the power supply 150 is installed on the second portion 122 of the base member 86. For example, the wall 154 helps align the two power supply electrical contacts with the two pins 180 at least laterally, such that the two power supply electrical contacts are physically and electrically connected to the two pins 180 within the sealing element 194.

The two pins 180 are, for example, sprung or spring loaded pogo pins. When the power supply 150 is installed on the second portion 122 (e.g., within the second alignment features) of the base member 86, electrical contacts on the power supply 150 corresponding to the two pins 180 compress the two pins 180, thus forming a physical and electrical connection between the electrical contacts on the power supply 150 and the two pins 180. When the power supply 150 is installed on the second portion 122 of the base member 86, the power supply 150 is electrically connected to the cable 128 via the electrical contacts on the power supply 150, the pins 180, and the connection between the pins 180 and the wires 184 of the cable 128 (e.g., soldering).

The second alignment features 152, for example, facilitate the positioning of the power supply 150 on the second side 132 of the second portion 122 of the base member 86 such that electrical contacts on the power supply 150 and the pins 180 are aligned horizontally and/or vertically such that the power supply 150 and the pins 180 are electrically connected when the power supply 150 is installed on the second portion 122 of the base member 86.

In an embodiment, the base member is configured such that a first portion of the base member includes power supply alignment features and/or power supply attachment features of a power supply attachment. FIGS. 27-31 illustrate a base member similar to the base member described with respect to FIGS. 11B and 13-19, where a second portion 122A of the base member 86A that is removably coupled to the first portion 120A of the base member 86A that includes power supply attachment features. The second portion 122A of the base member 86A has a first side 130A, a second side 132A at a distance from and opposite the first side 130A, and at least one third side 134A extending between the first side 130A and the second side 132A. When the second portion 122A of the base member 86A is coupled to the first portion 120A of the base member 86A, the first side 130A of the second portion 122A of the base member 86A abuts the first portion 120A of the base member 86A. The first portion 120A includes a side including a surface 125 configured to mate and/or otherwise interface with the second part 122A, for example with a mating surface of the first side 130A of the second portion 122A.

In this embodiment, the battery 96 includes features as described herein with respect to the power supply. All of the power supply attachment portions, or power supply attachment features of the base member, may be disposed on the first portion or the second portion of the base member. Alternatively, the power supply attachment features may be distributed between the first portion and the second portion of the base member.

Referring again to FIGS. 27-31, the first portion 120A of the base member 86A includes at least a portion of the power supply attachment, including at least one power supply attachment feature. The portion of the power supply attachment 143 and features thereof includes, for example, the battery retaining member 144 that is rotatably attached to the first portion 120A of the base member 86A at a connective mounting portion 147. The battery retaining member 144 may be rotatably attached to the first portion 120A of the base member 86A with, for example, a shaft 145 at the connective mounting portion 147. The second portion 122A of the base member 86A may include other power supply attachment features, such as stops 148.

Different locking action may be provided within the power supply attachment 143 to retain the power supply, such as the battery 96, on the base member 86A.

In this embodiment, the second alignment features 152A, 152B may be power supply alignment features and/or power supply attachment features. For example, the second alignment features 152A, 152B may interact with sides or surfaces of the power supply 96 to align power supply electrical contacts laterally with electrical contacts (e.g. pins, as described further herein) of the second portion 122A of the base member 86A. The second alignment features 152B may include a protrusion 153 forming a surface configured to interface with a corresponding surface of the power supply 96, for example. In an embodiment, the protrusion 153 forms a power supply attachment feature. In one example, the protrusion 153 includes a lip 155, with which a portion of the power supply 96 is positionable to aid in the securing of the power supply 96 to the base member 86A.

In this embodiment, the second portion 122A includes a receiving feature, or vacancy 157, for receiving the protrusion 153 of the first part 120A. In an assembled state, the protrusion 153 extends beyond a plane formed on the second part 122A at the power supply interface. The protrusion 153 forms a part of the first portion 120A that contacts the power supply, or battery 96, to partially, or totally, secure or attach the battery to the base member 86A.

Figure 20:
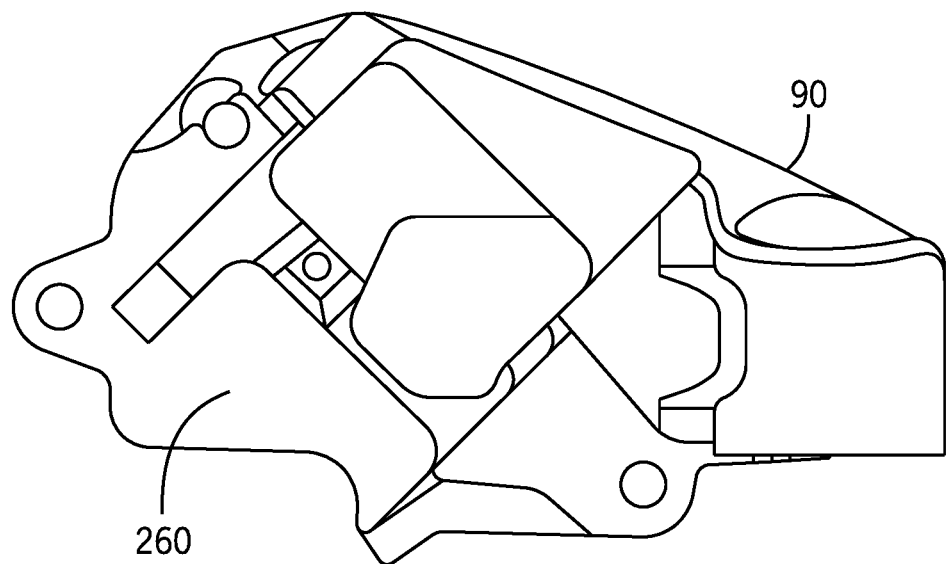
FIG. 20 is a first perspective view of one example of a movable member.
Figure 21:
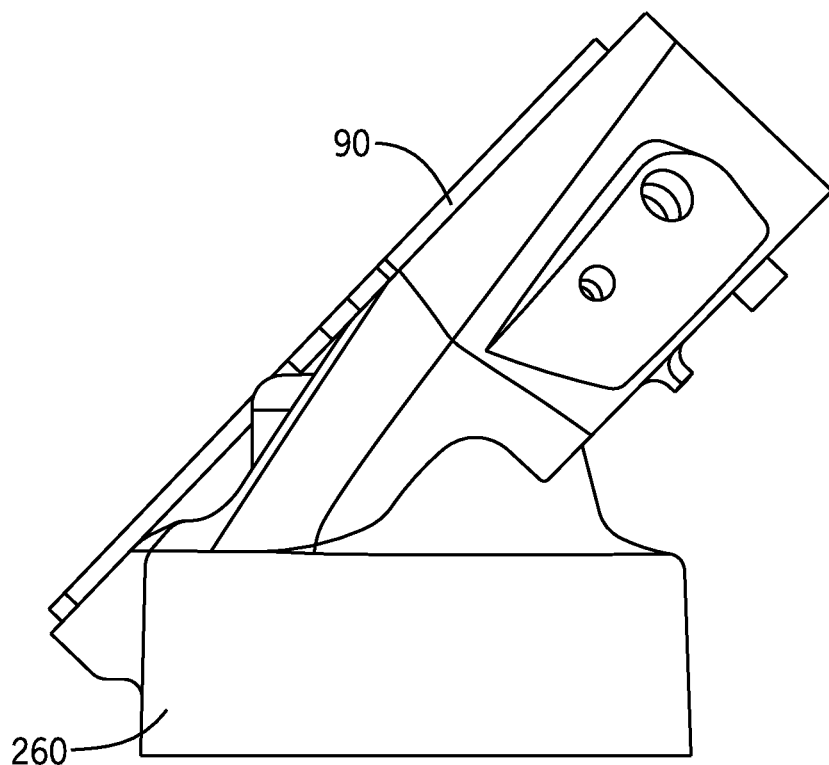
FIG. 21 is a second perspective view of one example of a movable member.

A second end 196 of the cable 128 includes a connector 198. The connector 198 may be any number of different types of connectors. Similarly to as described above, a physical and electrical connection between the wires 184 and the connector 198 may be disposed within an epoxy bath. The connector 198 is connectable to a corresponding connector within or outside of the rear derailleur 80. With reference to the examples shown in FIGS. 20-26, the connector 198 is connectable to a component within the movable member 90, examples of which are shown in FIGS. 20 and 21. The connector 198 may be connectable to other components within or outside of the bicycle 50, for example.

Figure 22:
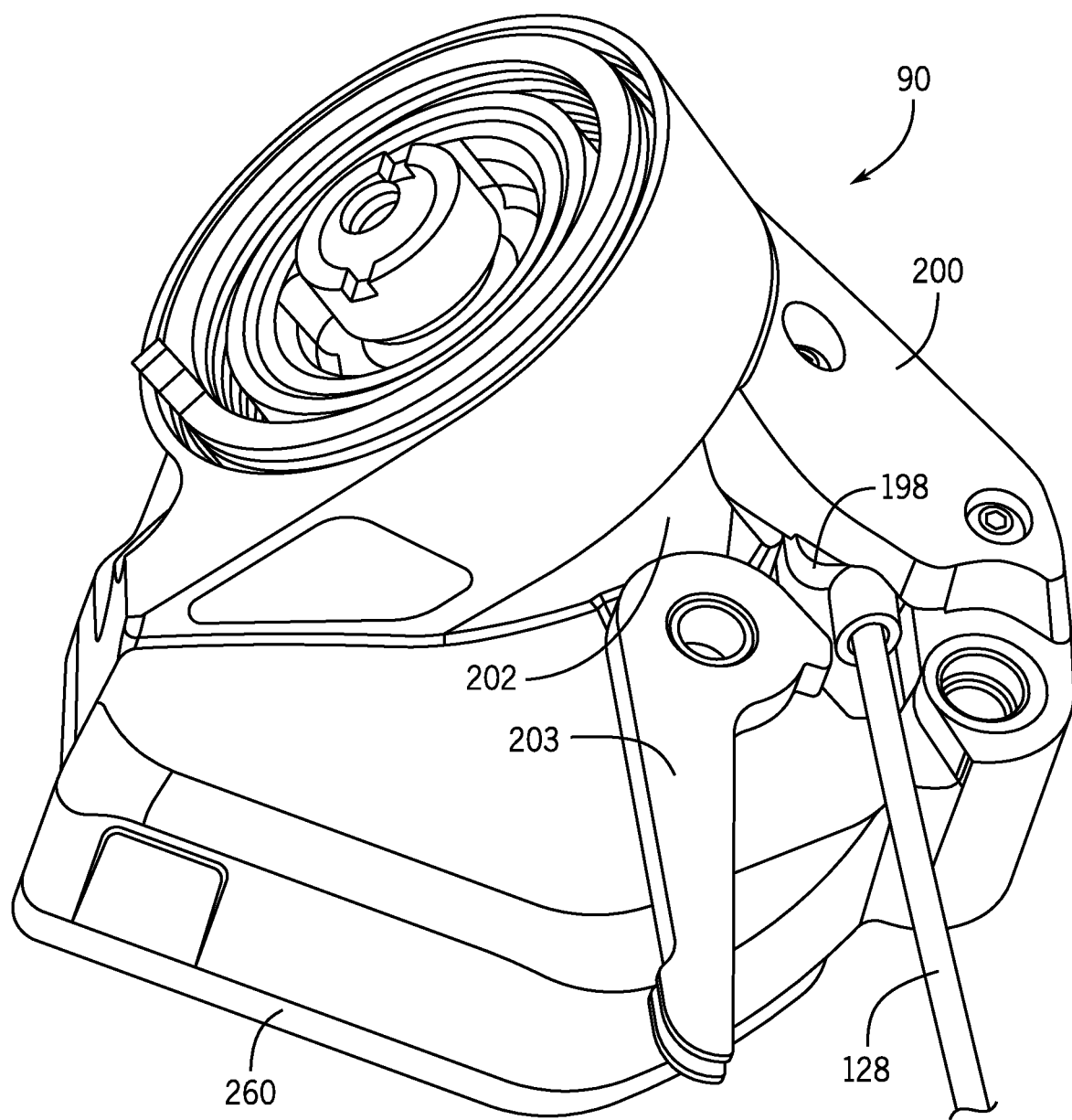
FIG. 22 is a third perspective view of one example of a movable member.
Figure 23:
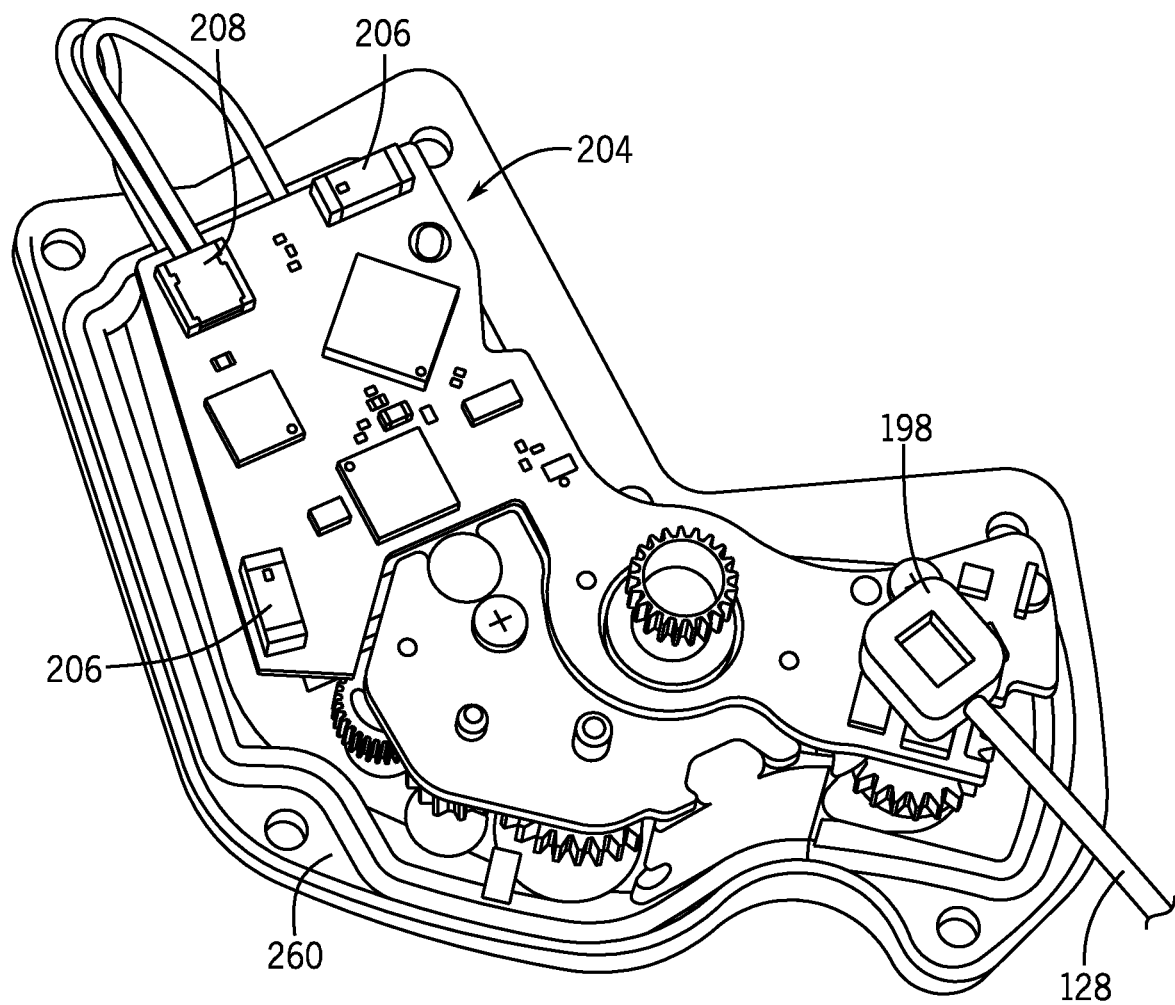
FIG. 23 is a perspective view of one example of a printed circuit board (PCB) supported within a portion of a movable member, with a cable connected to the PCB.
Figure 24:
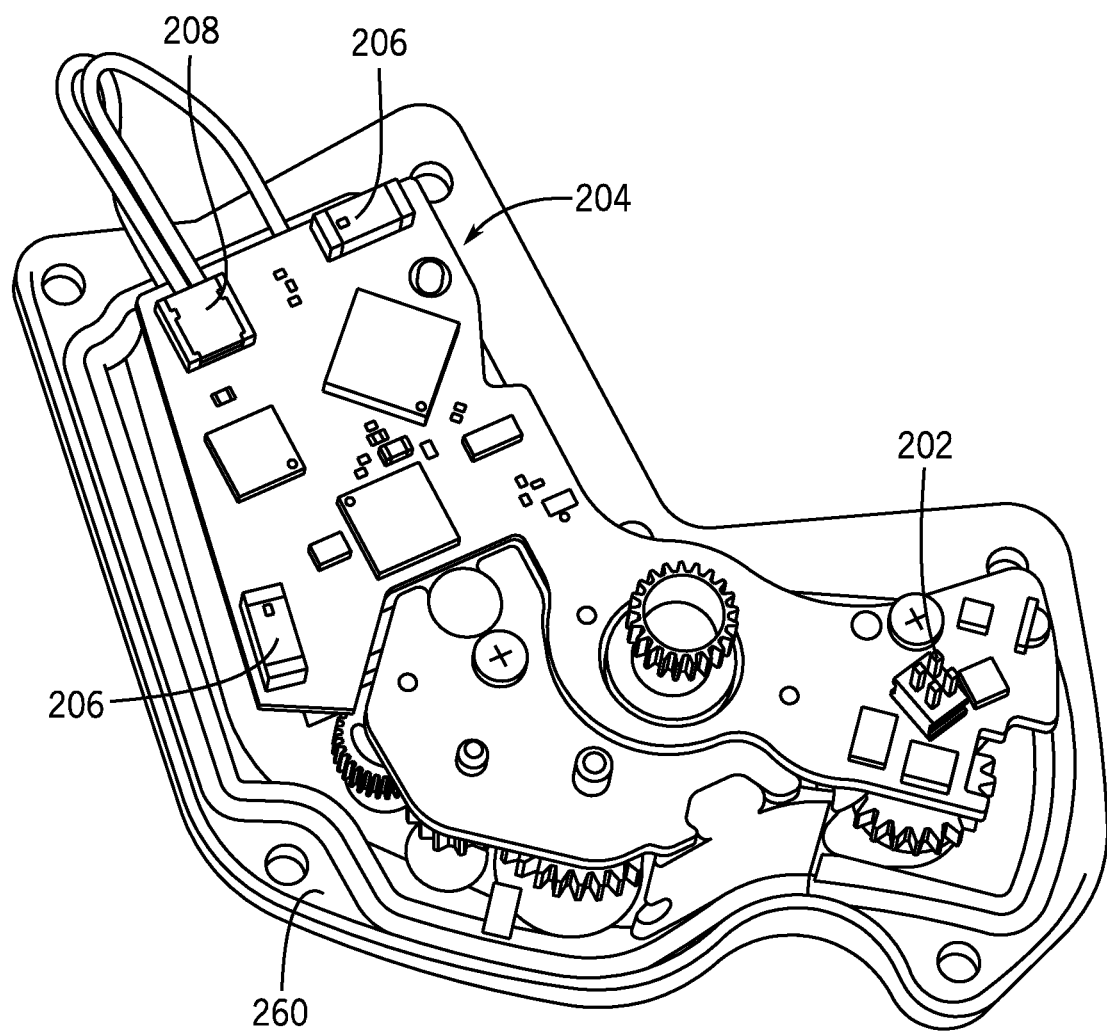
FIG. 24 is a perspective view of the PCB and moveable member portion of FIG. 23, without the cable connected to the PCB.

With reference to FIG. 22, the movable member 90 includes a cover 200 attached to a body of the movable member 90. The cover 200 helps retain the cable 128 and helps prevent water and debris from reaching the connection between the connector 198 and a component of the movable member 90. Further, in the displayed embodiment, the moveable member 90 includes a drive arm 203 which transfers the force of the gear-train to the linkage to move the moveable member With reference to FIGS. 23 and 24, the connector 198 may be connected to a corresponding connector 202 on the PCB 204 housed within the movable member 90, portions of the housing 260 of the moveable member 90 are shown in FIGS. 23-26. The power supply 150 powers components electrically connected to the PCB 204 via the pins 180, the cable 128, the connector 198, and the connector 202 when the power supply 150 is installed on the second portion 122 of the base member 86. The PCB 204 supports and/or the power supply 150 powers any number of components within the movable member 90. For example, as shown in the examples of FIGS. 23 and 24, the PCB 204 supports one or more antennas 206 (e.g., two antennas), and via a motor connection 208 electrically connecting two different sides of the PCB 204, the power supply 150 powers a motor. The PCB 204 may support and/or the power supply 150 may power additional, fewer, or different components.

Figure 25:
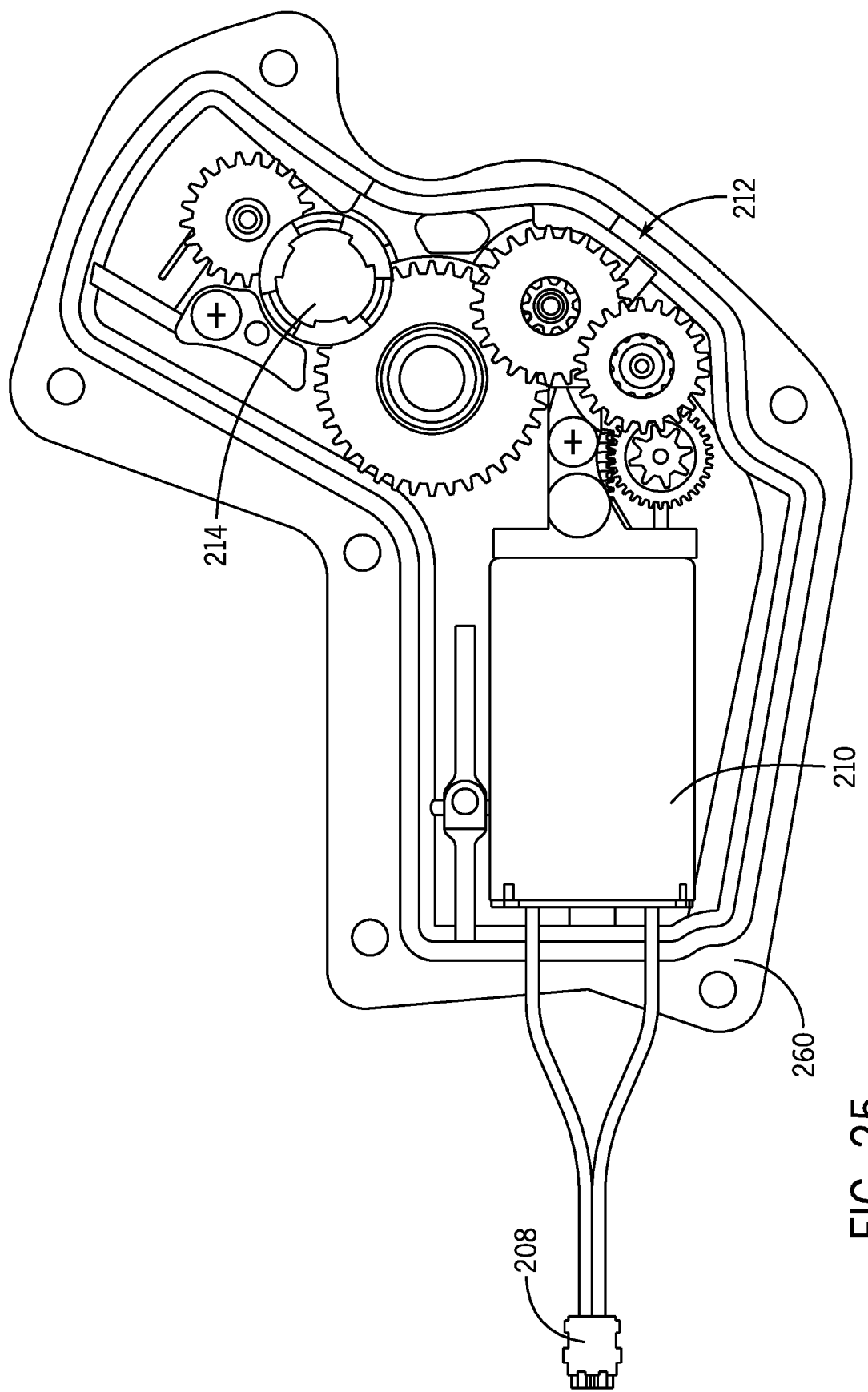
FIG. 25 is a side view of one example of a gear train and motor supported within a portion of the movable member.
Figure 26:
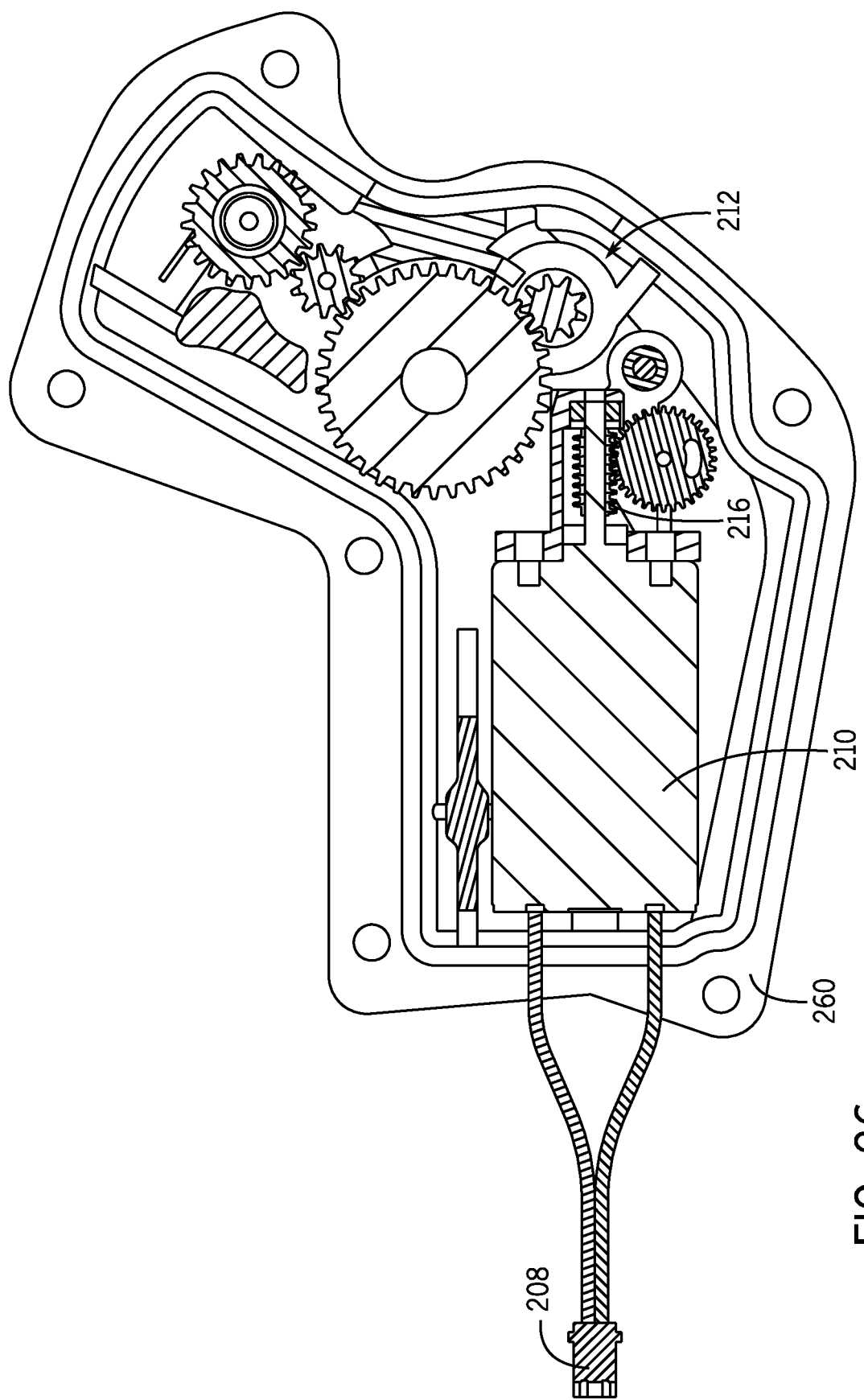
FIG. 26 is a section view through gear train and motor components of FIG. 25 supported by the portion of the movable member.
Figure 27:
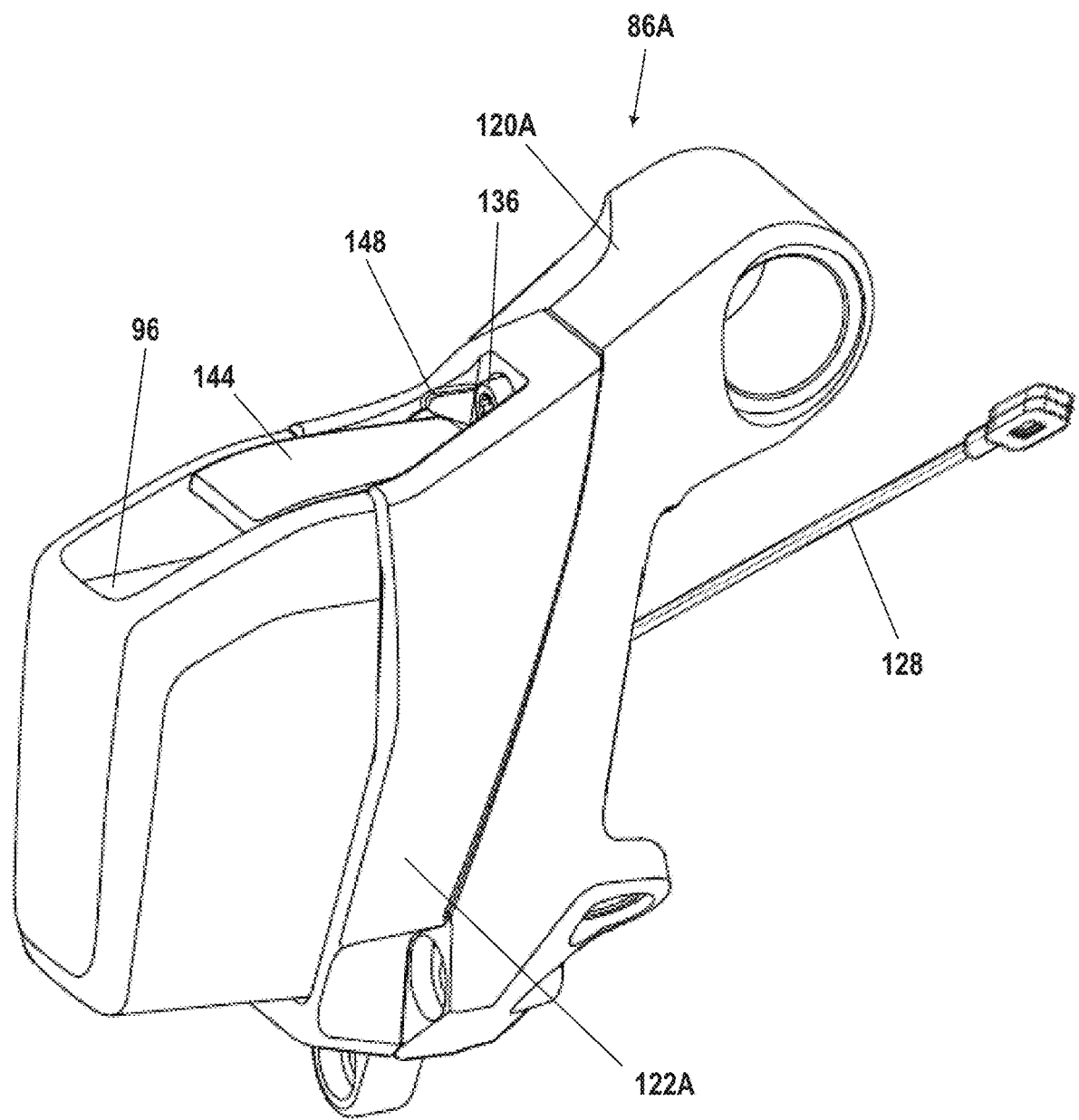
FIG. 27 is a perspective view of an alternative base member in accordance with the teachings of the present disclosure.
Figure 28:
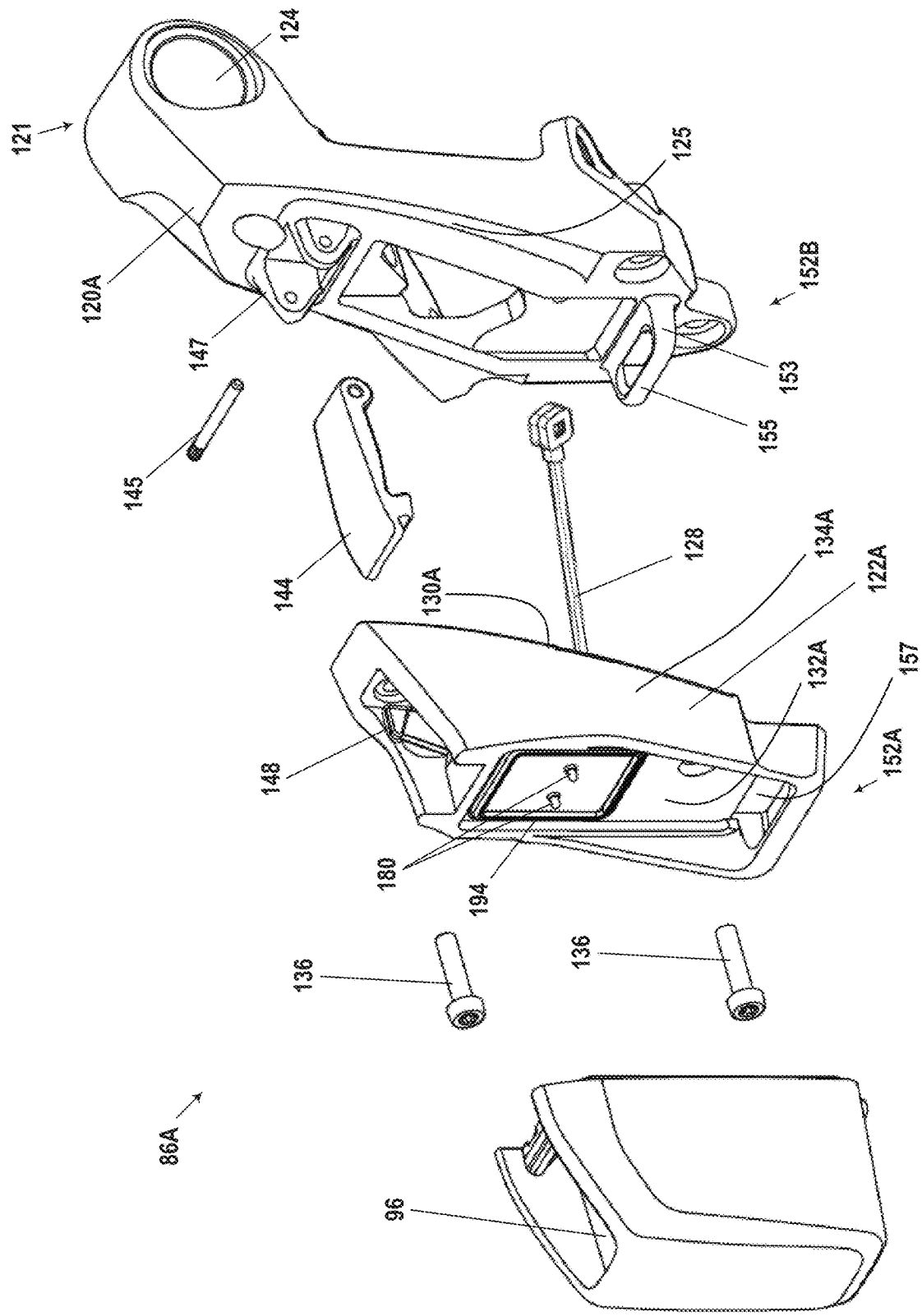
FIG. 28 is an exploded perspective view of the base member of FIG. 27.
Figure 29:
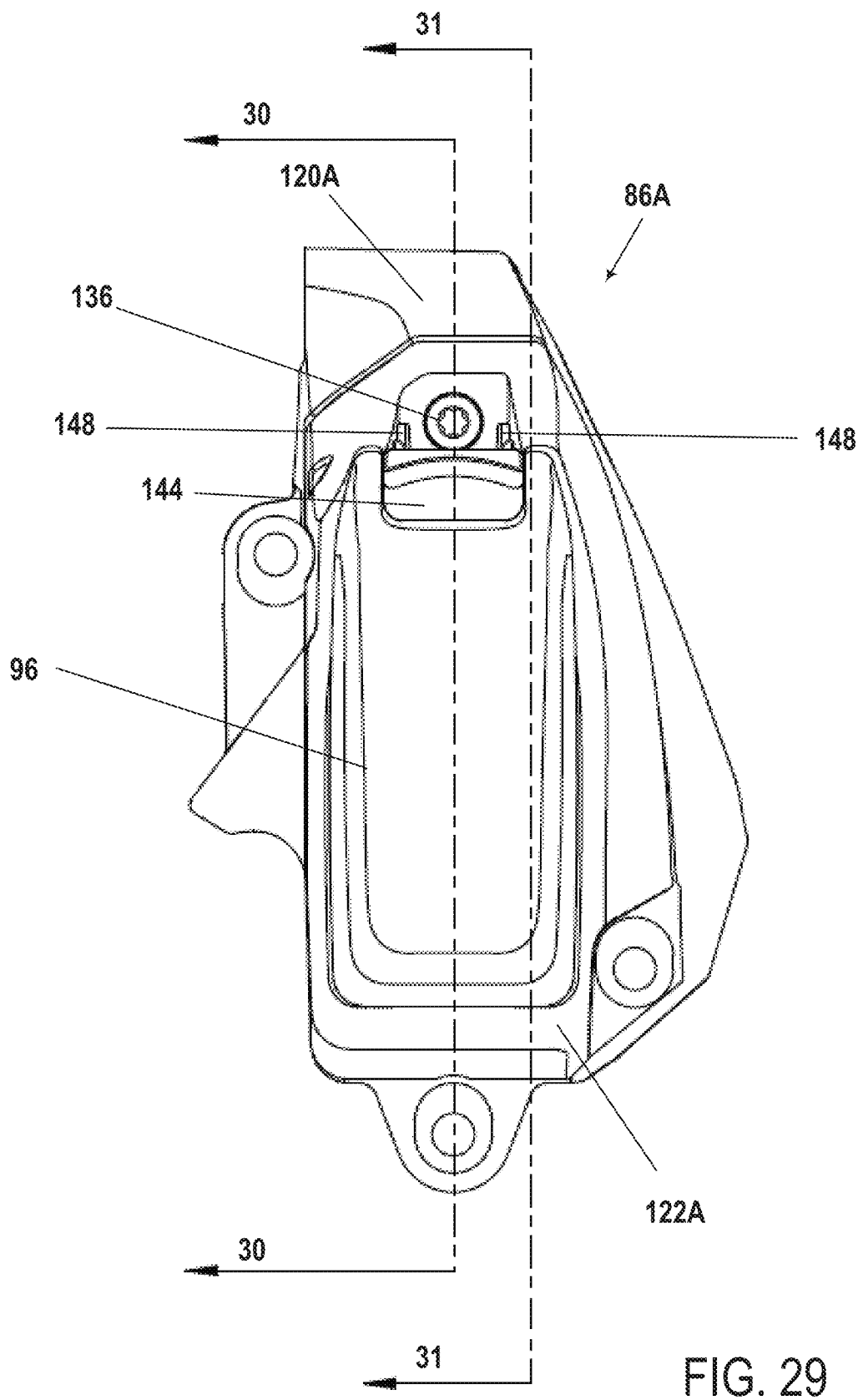
FIG. 29 is a rear view of the base member of FIG. 27.
Figure 30:
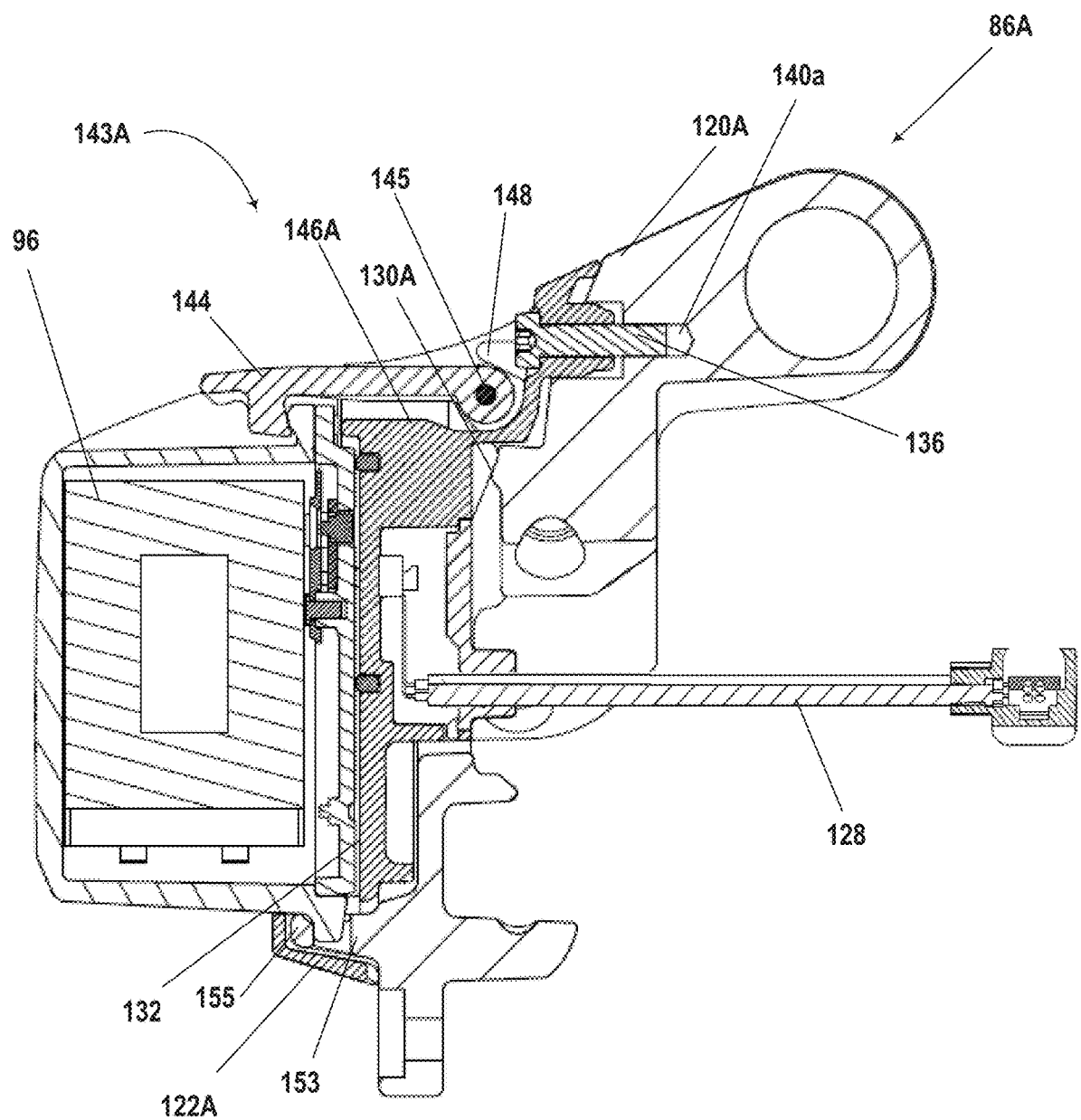
FIGS. 30-31 are sectional views of the base member of FIG. 27, as indicated in FIG. 29.
Figure 31:
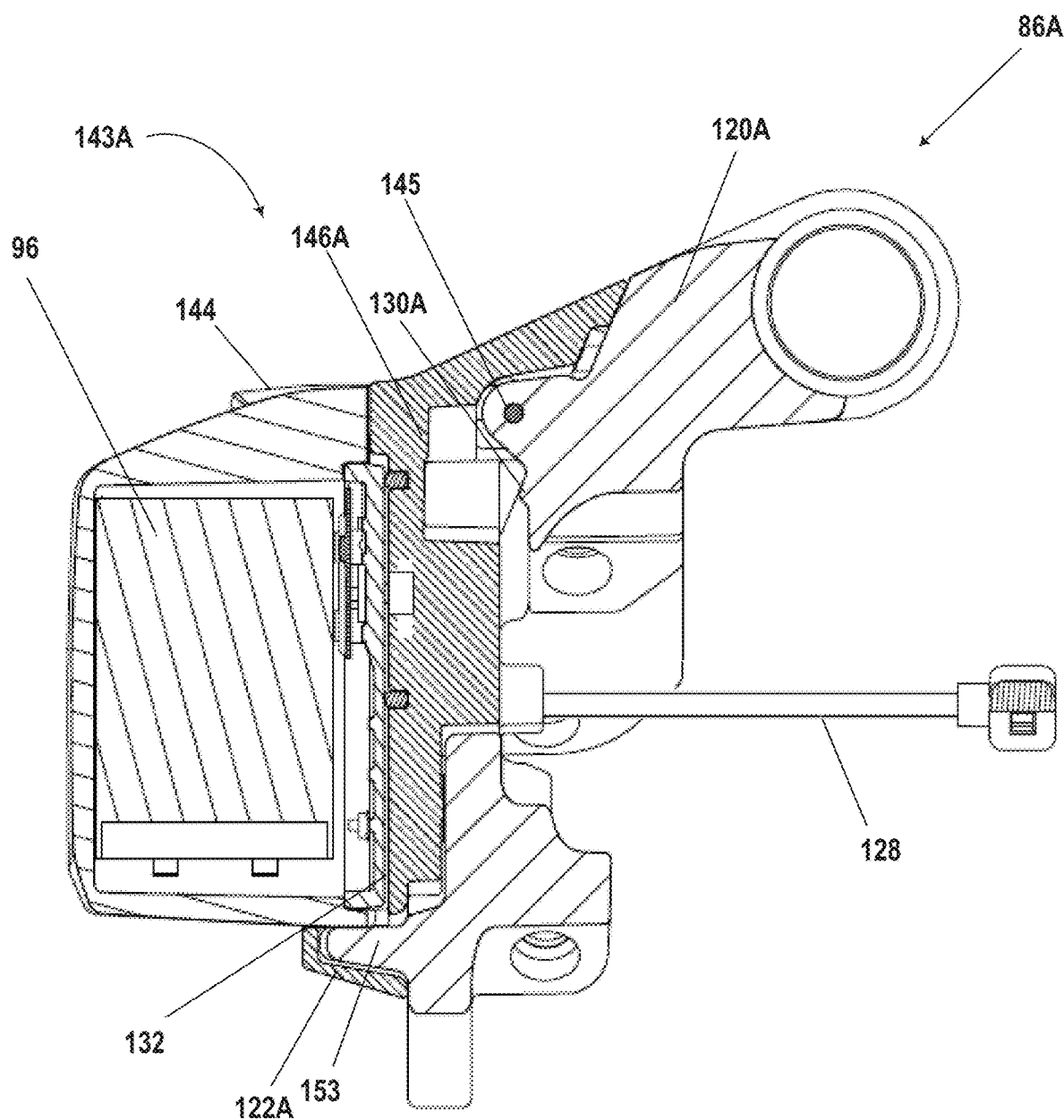

With reference to FIGS. 25 and 26, the movable member 90 may include, for example, a motor 210, a drive train 212, and an encoder 214 supported by and electrically connected via the PCB 204. The power supply 150 powers the motor 210 and drives the drive train 212 via an output worm gear 216, as shown in FIG. 26. The powered motor 210 drives the drive train 212 to move the moveable member, which in turn moves the chain C between different sprockets G1-G11.

In an embodiment, the first portion of the base member may include mounting features and be a mounting portion, and the second portion of the base member may be an electrical portion.

In an embodiment, the gear changer or derailleur may include a mounting portion mountable to a bicycle frame, an electrical portion attached to the mounting portion and including power supply alignment and attachment features, and an electrical cable electrically connected to the electrical portion and electrically connectable to a printed circuit board (PCB) of a movable member movably coupleable to the mounting portion. The mounting portion and the electrical portion may be formed of different materials. The electrical portion may have a first side and a second side, the second side being opposite the first side. The first side of the electrical portion may be attached to the mounting portion. The electrical portion may include a recess at the second side. The recess may form the alignment features.

In an embodiment, the derailleur may also include at least one electrical contact electrically connected to the electrical cable, the at least one electrical contact extending at least partially through the electrical portion. The at least one electrical contact may be electrically connectable with the power supply when the power supply is positioned within the recess of the electrical portion.

In an embodiment, the mounting portion may be formed of aluminum and the electrical portion may be formed of a plastic.

In an embodiment, the derailleur may also include a power supply retaining member rotatably attached to the electrical portion. The derailleur may also include a protrusion extending away from a surface of the electrical portion. The power supply retaining member may be rotatable between a first rotational position relative to the electrical portion and a second rotational position relative to the electrical portion. The power supply retaining member and the protrusion may form the attachment features. The protrusion may be formed on the mounting portion.

In an embodiment, the electrical portion may be disposed rearward of the mounting portion relative to a forward direction of the bicycle.

In an embodiment, the electrical cable may extend through an orifice of the mounting portion.

In an embodiment, the derailleur may also include a moveable member and a linkage. The linkage may be attached to the mounting portion and operable to facilitate movement of the moveable member relative to the mounting portion. The derailleur may also include a power supply mounted to the electrical portion with the alignment and attachment features. The derailleur may also include a motor operable to cause the movement of the moveable member. The power supply may provide power to the motor through the electrical cable. The motor may be disposed on the moveable member. The derailleur may also include a cage rotatably attached to the moveable member configured to engage and maintain tension in a chain of the bicycle. The derailleur may also include a damper disposed on the moveable member and configured to resist the rotation of the cage. The derailleur may also include a biasing member configured to bias the cage in a rotational direction of the cage.

In an embodiment, the PCB includes a wireless communication device for receiving wireless signals to control the motor.

In an embodiment, a drivetrain for a bicycle is provided. The drivetrain includes a crank assembly including a front sprocket assembly. The drivetrain also includes a rear sprocket assembly including a plurality of sprockets, and a chain operably connecting the front sprocket assembly and the rear sprocket assembly. The drivetrain also includes a rear gear changer configured to move the chain between individual sprockets of the plurality of sprockets of the rear sprocket assembly. The rear gear changer may include a mounting portion mountable to a bicycle frame and an electrical portion attached to the mounting portion and including power supply alignment and attachment features. The rear gear changer also may include an electrical cable electrically connected to the electrical portion and electrically connectable to a printed circuit board (PCB) of a movable member movably coupleable to the mounting portion. In an embodiment, the mounting portion and the electrical portion are formed of different materials.

In an embodiment, the rear gear changer includes a moveable member and a linkage. The linkage may be attached to the mounting portion and operable to facilitate movement of the moveable member relative to the mounting portion. The rear gear changer may also include a power supply mounted to the electrical portion with the alignment and attachment features, and a motor operable to cause the movement of the moveable member. The rear gear changer may be configured such that the power supply provides power to the motor through the electrical cable.

In an embodiment, the rear gear changer may include a cage rotatably attached to the moveable member configured to engage and maintain tension in a chain of the bicycle, and a damper disposed on the moveable member and configured to resist the rotation of the cage.

In an embodiment, the PCB includes a wireless communication device for receiving wireless signals to control the motor.

The disclosed base members eliminate the battery retention features from the first portion of the base member (e.g., the forged metal part) and include the battery retention features on the second portion of the base member (e.g., the injection molded plastic portion) of the b-knuckle. The forging and/or machining of the base member is greatly simplified, and the cost of manufacturing the base member is reduced compared to the prior art method of manufacturing.

Each of the above-described examples of a base member of a rear derailleur illustrates that the configuration and construction of the base members can be varied in different ways. However, other examples different from those disclosed and described herein are also possible. The invention and the disclosure are not intended to be limited to only the examples discussed above.

Although certain base members, bicycle derailleurs, and bicycles have been described herein in accordance with the teachings of the present disclosure, the scope of coverage of this patent is not limited thereto. On the contrary, this patent covers all embodiments of the teachings of the disclosure that fairly fall within the scope of permissible equivalents.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A derailleur for a bicycle comprising:
    a base member having a mounting portion and an electrical portion,
    the mounting portion mountable to a bicycle frame, the mounting portion including power supply attachment features, the power supply attachment features including a power supply retaining member rotatably attached to the mounting portion, and a protrusion extending from a surface of the mounting portion,
    the electrical portion attached to and adjacent to the mounting portion and including a power supply alignment feature, the power supply alignment feature including a vacancy in the electrical portion for receiving the protrusion extending from the surface of the mounting portion; and
    an electrical cable electrically connected to the electrical portion and electrically connectable to a printed circuit board (PCB) of a movable member movably coupleable to the mounting portion,
    wherein the mounting portion and the electrical portion are formed of different materials.

2. The derailleur of claim 1, wherein the electrical portion has a first side and a second side, the second side being opposite the first side, and
    wherein the first side of the electrical portion is a curved surface configured to mate with and be attached to the mounting portion, and the electrical portion includes a recess at the second side.

3. The derailleur of claim 2, further comprising at least one electrical contact electrically connected to the electrical cable, the at least one electrical contact extending at least partially through the electrical portion, and
    wherein the at least one electrical contact is electrically connectable with the power supply when the power supply is positioned within the recess of the electrical portion.

4. The derailleur of claim 1, wherein the mounting portion is formed of aluminum and the electrical portion is formed of a plastic.

5. The derailleur of claim 1, wherein the power supply retaining member is rotatable between a first rotational position relative to the mounting portion and a second rotational position relative to the mounting portion.

6. The derailleur of claim 5, wherein the protrusion is formed on the mounting portion, and includes a lip.

7. The derailleur of claim 1, wherein the electrical portion is disposed rearward of the mounting portion relative to a forward direction of the bicycle.

8. The derailleur of claim 1, wherein the electrical cable extends through an orifice of the mounting portion.

9. The derailleur of claim 1, further comprising a moveable member and a linkage, wherein the linkage is attached to the mounting portion and operable to facilitate movement of the moveable member relative to the mounting portion.

10. The derailleur of claim 9, further comprising:
    a power supply mounted to the electrical portion with the power supply alignment features; and
    a motor operable to cause the movement of the moveable member,
    wherein the power supply provides power to the motor through the electrical cable.

11. The derailleur of claim 10, wherein the motor is disposed on the moveable member.

12. The derailleur of claim 11, further comprising a cage rotatably attached to the moveable member configured to engage and maintain tension in a chain of the bicycle.

13. The derailleur of claim 12, further comprising a damper disposed on the moveable member and configured to resist the rotation of the cage.

14. The derailleur of claim 13, further comprising a biasing member configured to bias the cage in a rotational direction of the cage.

15. The derailleur of claim 13, wherein the PCB includes a wireless communication device for receiving wireless signals to control the motor.

16. A drivetrain for a bicycle, the drivetrain comprising:
    a crank assembly including a front sprocket assembly;
    a rear sprocket assembly including a plurality of sprockets;
    a chain operably connecting the front sprocket assembly and the rear sprocket assembly; and
    a rear gear changer configured to move the chain between individual sprockets of the plurality of sprockets of the rear sprocket assembly, the rear gear changer comprising:
        a base member having a mounting portion and an electrical portion,
        the mounting portion mountable to a bicycle frame, the mounting portion including power supply attachment features, the power supply attachment features including a power supply retaining member rotatably attached to the mounting portion, and a protrusion extending from a surface of the mounting portion,
        the electrical portion attached to and adjacent to the mounting portion and including a power supply alignment feature, the power supply alignment feature including a vacancy in the electrical portion for receiving the protrusion extending from the surface of the mounting portion; and an electrical cable electrically connected to the electrical portion and electrically connectable to a printed circuit board (PCB) of a movable member movably coupleable to the mounting portion, wherein the mounting portion and the electrical portion are formed of different materials.

17. The bicycle drivetrain of claim 16, wherein the rear gear changer comprises a moveable member and a linkage, wherein the linkage is attached to the mounting portion and operable to facilitate movement of the moveable member relative to the mounting portion.

18. The bicycle drivetrain of claim 17, wherein the rear gear changer further comprises:

a power supply mounted to the electrical portion with the power supply alignment features; and a motor operable to cause the movement of the moveable member, wherein the power supply provides power to the motor through the electrical cable.

19. The bicycle drivetrain of claim 18, wherein the rear gear changer further comprises:

a cage rotatably attached to the moveable member configured to engage and maintain tension in a chain of the bicycle, and a damper disposed on the moveable member and configured to resist the rotation of the cage.

20. The bicycle drivetrain of claim 19, wherein the PCB includes a wireless communication device for receiving wireless signals to control the motor.

\* \* \* \* \*